US012759278B2

(12) United States Patent
Burrows

(10) Patent No.: US 12,759,278 B2
(45) Date of Patent: Oct. 13, 2026

(54) HANDLING TECHNOLOGY FOR FRAGILE MATERIALS SUCH AS AEROGELS

(71) Applicant: Cardinal CG Company, Eden Prairie, MN (US)

(72) Inventor: Keith James Burrows, Mineral Point, WI (US)

(73) Assignee: Cardinal CG Company, Eden Prairie, MN (US)

( * ) Notice: Subject to any disclaimer, the term of this patent is extended or adjusted under 35 U.S.C. 154(b) by 94 days.

(21) Appl. No.: 18/536,611

(22) Filed: Dec. 12, 2023

(65) Prior Publication Data

US 2024/0198650 A1 Jun. 20, 2024

Related U.S. Application Data

(60) Provisional application No. 63/387,442, filed on Dec. 14, 2022.

(51) Int. Cl.
*B32B 41/00* (2006.01)
*B32B 37/00* (2006.01)
*B32B 38/18* (2006.01)

(52) U.S. Cl.
CPC .......... *B32B 38/18* (2013.01); *B32B 37/0046* (2013.01)

(58) Field of Classification Search
CPC ... B32B 38/18; B32B 37/0046; B25J 15/0085
USPC .................... 156/60, 64, 350, 351, 378, 379
See application file for complete search history.

(56) References Cited

U.S. PATENT DOCUMENTS

| | | | |
|---|---|---|---|
| 2,525,717 | A | 10/1950 | Ottenheimer |
| 2,539,079 | A | 1/1951 | Holland |
| 2,708,774 | A | 5/1955 | Seelen |
| 2,838,810 | A | 6/1958 | Englehart et al. |
| 3,105,274 | A | 10/1963 | Armstrong |
| 3,226,903 | A | 1/1966 | Lillethun |
| 3,261,139 | A | 7/1966 | Bond |
| 3,280,523 | A | 10/1966 | Stroud et al. |
| 3,389,522 | A | 6/1968 | Hordis |
| 3,438,166 | A | 4/1969 | Bakke |
| 3,442,059 | A | 5/1969 | Kessler |
| 3,524,920 | A | 8/1970 | Stromquist et al. |
| 3,672,833 | A | 6/1972 | Teichner et al. |
| 3,710,074 | A | 1/1973 | Stewart |
| 3,775,914 | A | 12/1973 | Patil |
| 3,880,297 | A | 4/1975 | Martin |
| 3,889,434 | A | 6/1975 | Shelver |

(Continued)

FOREIGN PATENT DOCUMENTS

| | | |
|---|---|---|
| AU | 688208 B2 | 3/1998 |
| CN | 102180603 A | 9/2011 |

(Continued)

OTHER PUBLICATIONS

Amonette et al., "Functionalized Silica Aerogels for Gas-Phase Purification, Sensing, and Catalysis: A Review", Microporous and Mesoporous Materials, Published: Apr. 27, 2017, pp. 49.

(Continued)

*Primary Examiner* — Michael N Orlando
*Assistant Examiner* — Joshel Rivera
(74) *Attorney, Agent, or Firm* — Fredrikson & Byron, P.A.

(57) ABSTRACT

Apparatuses, systems, and methods for delicate handling of fragile materials, such as aerogels, fragile sheet-like materials and aerogel sheets.

39 Claims, 19 Drawing Sheets

(56) References Cited

U.S. PATENT DOCUMENTS

| | | | |
|---|---|---|---|
| 3,940,898 | A | 3/1976 | Kaufman |
| 3,941,370 | A | 3/1976 | Martin et al. |
| 3,941,371 | A | 3/1976 | Martin |
| 3,974,822 | A | 8/1976 | Patil |
| 3,976,237 | A | 8/1976 | Bossons |
| 3,990,201 | A | 11/1976 | Falbel |
| 4,015,394 | A | 4/1977 | Kessler |
| 4,069,630 | A | 1/1978 | Chess et al. |
| 4,424,653 | A | 1/1984 | Heinen |
| 4,432,956 | A | 2/1984 | Zarzycki et al. |
| 4,786,344 | A | 11/1988 | Beuther |
| 4,817,351 | A | 4/1989 | Michlovic |
| 4,848,875 | A | 7/1989 | Baughman et al. |
| 4,863,340 | A | 9/1989 | Masunaga et al. |
| 4,913,049 | A | 4/1990 | Sainio |
| 4,928,448 | A | 5/1990 | Phillip |
| 5,056,431 | A | 10/1991 | Sainio |
| 5,092,101 | A | 3/1992 | Kunert |
| 5,107,655 | A | 4/1992 | Lindgren |
| 5,118,543 | A | 6/1992 | Mccoll |
| 5,124,185 | A | 6/1992 | Kerr et al. |
| 5,154,953 | A | 10/1992 | De Moncuit et al. |
| 5,197,242 | A | 3/1993 | Baughman et al. |
| 5,242,647 | A | 9/1993 | Poco |
| 5,275,796 | A | 1/1994 | Tillotson et al. |
| 5,294,480 | A | 3/1994 | Mielke et al. |
| 5,565,142 | A | 10/1996 | Deshpande et al. |
| 5,683,784 | A | 11/1997 | Nakao et al. |
| 5,719,705 | A | 2/1998 | Machol |
| 5,744,215 | A | 4/1998 | Neuman |
| 5,775,623 | A | 7/1998 | Long |
| 5,795,557 | A | 8/1998 | Pajonk et al. |
| 5,973,015 | A | 10/1999 | Coronado et al. |
| 6,080,470 | A | 6/2000 | Dorfman |
| 6,122,935 | A | 9/2000 | Glodis et al. |
| 6,167,834 | B1 | 1/2001 | Wang et al. |
| 6,235,652 | B1 | 5/2001 | Cook et al. |
| 6,401,428 | B1 | 6/2002 | Glover et al. |
| 6,606,929 | B2 | 8/2003 | Evreniadis |
| 6,627,305 | B1 | 9/2003 | Deane et al. |
| 6,656,527 | B1 | 12/2003 | Gessner et al. |
| 6,670,402 | B1 | 12/2003 | Lee et al. |
| 6,740,416 | B1 | 5/2004 | Yokogawa et al. |
| 6,818,309 | B1 | 11/2004 | Talpaert et al. |
| 6,922,324 | B1 | 7/2005 | Horwitz |
| 7,001,568 | B2 | 2/2006 | Wang et al. |
| 7,078,359 | B2 | 7/2006 | Stepanian et al. |
| 7,162,841 | B2 | 1/2007 | Kownacki |
| 7,543,416 | B2 | 6/2009 | Albertelli |
| 7,635,411 | B2 | 12/2009 | Rouanet et al. |
| 7,635,603 | B2 | 12/2009 | Yang et al. |
| 7,832,177 | B2 | 11/2010 | Stark |
| 7,919,158 | B2 | 4/2011 | Seth et al. |
| 7,954,283 | B1 | 6/2011 | Tinianov |
| 8,021,583 | B2 | 9/2011 | Rouanet et al. |
| 8,110,258 | B2 | 2/2012 | Milburn |
| 8,342,588 | B2 | 1/2013 | Skaradzinski |
| 8,402,716 | B2 | 3/2013 | Tinianov et al. |
| 8,557,236 | B2 | 10/2013 | Mccrink et al. |
| 8,557,356 | B2 | 10/2013 | Colson |
| 8,564,926 | B2 | 10/2013 | Prahlad et al. |
| 8,844,218 | B2 | 9/2014 | Showers |
| 8,915,032 | B1 | 12/2014 | Rivera et al. |
| 9,068,346 | B1 | 6/2015 | Lu et al. |
| 9,096,031 | B2 | 8/2015 | Showers |
| 9,120,634 | B1 | 9/2015 | Muir et al. |
| 9,169,687 | B2 | 10/2015 | Schreiber et al. |
| 9,272,942 | B2 | 3/2016 | Trommer et al. |
| 9,327,460 | B2 | 5/2016 | Biver et al. |
| 9,481,603 | B2 | 11/2016 | Reymond et al. |
| 9,487,438 | B2 | 11/2016 | Cording et al. |
| 9,515,217 | B2 | 12/2016 | Moslehi et al. |
| 9,546,513 | B2 | 1/2017 | Stark et al. |
| 9,583,651 | B2 | 2/2017 | Moslehi et al. |
| 9,739,085 | B2 | 8/2017 | Kuster et al. |
| 9,790,396 | B2 | 10/2017 | Klun et al. |
| 9,834,930 | B2 | 12/2017 | Braun et al. |
| 9,869,422 | B2 | 1/2018 | Shen et al. |
| 9,897,332 | B2 | 2/2018 | Glover et al. |
| 9,903,549 | B2 | 2/2018 | Padiyath et al. |
| 9,969,131 | B2 | 5/2018 | Samak Sangari et al. |
| 9,987,755 | B2 | 6/2018 | Prahlad et al. |
| 9,997,657 | B2 | 6/2018 | Weigel et al. |
| 10,256,432 | B2 | 4/2019 | Kajikawa et al. |
| 10,267,084 | B2 | 4/2019 | Weinryb et al. |
| 10,301,868 | B2 | 5/2019 | Kuster et al. |
| 10,377,583 | B2 | 8/2019 | Strass |
| 10,464,760 | B2 | 11/2019 | Herfert |
| 10,466,390 | B2 | 11/2019 | Kobori |
| 10,626,224 | B2 | 4/2020 | Chintapalli et al. |
| 10,787,586 | B2 | 9/2020 | Simpson |
| 10,801,255 | B2 | 10/2020 | Hermens et al. |
| 10,991,844 | B2 | 4/2021 | Gislon et al. |
| 11,094,573 | B2 | 8/2021 | Qiao et al. |
| 11,117,774 | B2 | 9/2021 | Tanchak et al. |
| 11,155,690 | B2 | 10/2021 | Dufour et al. |
| 11,286,167 | B2 | 3/2022 | Xiang |
| 11,346,149 | B2 | 5/2022 | Neander et al. |
| 11,466,508 | B2 | 10/2022 | Sala et al. |
| 11,640,905 | B2 | 5/2023 | Aydin et al. |
| 12,115,599 | B2 | 10/2024 | Jetter et al. |
| 12,187,869 | B2 | 1/2025 | Duong et al. |
| 2002/0102674 | A1 | 8/2002 | Anderson |
| 2005/0159497 | A1 | 7/2005 | Gauthier et al. |
| 2005/0175852 | A1 | 8/2005 | Okudera et al. |
| 2006/0081004 | A1 | 4/2006 | Ishikawa et al. |
| 2008/0258065 | A1 | 10/2008 | Banks |
| 2011/0120031 | A1 | 5/2011 | Scherba |
| 2012/0128958 | A1 | 5/2012 | Zeng et al. |
| 2013/0136664 | A1 | 5/2013 | Bono et al. |
| 2013/0164883 | A1 | 6/2013 | Moslehi et al. |
| 2013/0170218 | A1 | 7/2013 | Mazurek et al. |
| 2013/0202890 | A1 | 8/2013 | Kong et al. |
| 2014/0065329 | A1 | 3/2014 | Showers |
| 2014/0287641 | A1 | 9/2014 | Steiner, III |
| 2015/0004087 | A1 | 1/2015 | Zettl et al. |
| 2016/0160557 | A1 | 6/2016 | Kim et al. |
| 2016/0318190 | A1 | 11/2016 | Prahlad et al. |
| 2016/0319588 | A1 | 11/2016 | Samanta et al. |
| 2017/0321473 | A1 | 11/2017 | Frank et al. |
| 2018/0244029 | A1 | 8/2018 | Kim et al. |
| 2018/0245205 | A1 | 8/2018 | Salomon et al. |
| 2018/0264784 | A1 | 9/2018 | Murofushi et al. |
| 2019/0013746 | A1 | 1/2019 | Heinz |
| 2019/0144701 | A1 | 5/2019 | Nakamura et al. |
| 2019/0225498 | A1 | 7/2019 | Ruiz et al. |
| 2019/0322084 | A1 | 10/2019 | Yoshida et al. |
| 2019/0333490 | A1 | 10/2019 | Wang et al. |
| 2020/0010328 | A1 | 1/2020 | Kim et al. |
| 2020/0056422 | A1 | 2/2020 | Kuster et al. |
| 2020/0061962 | A1 | 2/2020 | Yoshida et al. |
| 2020/0324451 | A1 | 10/2020 | Kuster et al. |
| 2020/0378058 | A1 | 12/2020 | Oikawa et al. |
| 2021/0041694 | A1 | 2/2021 | Chang et al. |
| 2021/0115214 | A1 | 4/2021 | Ejaz et al. |
| 2022/0009786 | A1 | 1/2022 | Hintemann et al. |
| 2022/0042369 | A1* | 2/2022 | Burrows .................. E06B 3/67 |
| 2022/0042370 | A1 | 2/2022 | Burrows |
| 2022/0186550 | A1 | 6/2022 | Fleury et al. |
| 2023/0050347 | A1 | 2/2023 | Kitzman et al. |
| 2023/0398515 | A1 | 12/2023 | Konstas et al. |
| 2024/0337950 | A1 | 10/2024 | Kunze et al. |

FOREIGN PATENT DOCUMENTS

| | | | |
|---|---|---|---|
| CN | 202706291 | U | 1/2013 |
| CN | 204056721 | U | 12/2014 |
| CN | 104898295 | A | 9/2015 |
| CN | 105201355 | A | 12/2015 |
| CN | 204936377 | U | 1/2016 |
| CN | 105314268 | A | 2/2016 |
| CN | 205117117 | U | 3/2016 |
| CN | 205117118 | U | 3/2016 |
| CN | 106082697 | A | 11/2016 |

(56) References Cited

FOREIGN PATENT DOCUMENTS

| | | | |
|---|---|---|---|
| CN | 205736249 | U | 11/2016 |
| CN | 206589417 | U | 10/2017 |
| CN | 206983435 | U | 2/2018 |
| CN | 207190441 | U | 4/2018 |
| CN | 208119841 | U | 11/2018 |
| CN | 208897761 | U | 5/2019 |
| CN | 112340741 | A | 2/2021 |
| CN | 112961397 | A | 6/2021 |
| CN | 113086426 | A | 7/2021 |
| CN | 113289558 | A | 8/2021 |
| CN | 115265088 | A | 11/2022 |
| CN | 217703694 | U | 11/2022 |
| CN | 217891064 | U | 11/2022 |
| CN | 218138255 | U | 12/2022 |
| CN | 115649650 | A | 1/2023 |
| CN | 218365177 | U | 1/2023 |
| CN | 219238556 | U | 6/2023 |
| CN | 219685832 | U | 9/2023 |
| DE | 2262040 | A1 | 6/1974 |
| EP | 1414266 | A2 | 4/2004 |
| EP | 3112773 | A1 | 1/2017 |
| GB | 1591064 | A | 6/1981 |
| GB | 2241468 | A | 9/1991 |
| GB | 2261247 | A | 5/1993 |
| JP | 2019127357 | A | 8/2019 |
| JP | 2019136813 | A | 8/2019 |
| KR | 101972715 | B1 | 4/2019 |
| WO | 2008110988 | A2 | 9/2008 |
| WO | 2013131807 | A1 | 9/2013 |
| WO | 2015071217 | A1 | 5/2015 |
| WO | 2017090686 | A1 | 6/2017 |
| WO | 2017147463 | A1 | 8/2017 |
| WO | 2018034573 | A1 | 2/2018 |
| WO | 2018129272 | A1 | 7/2018 |
| WO | 2019153011 | A1 | 8/2019 |
| WO | 2022031529 | A1 | 2/2022 |
| WO | 2022031536 | A1 | 2/2022 |
| WO | 2022268690 | A1 | 12/2022 |
| WO | 2024080239 | A1 | 4/2024 |
| WO | 2024155802 | A1 | 7/2024 |
| WO | 2025024450 | A1 | 1/2025 |

OTHER PUBLICATIONS

Cai et al., "Cellulose-Silica Nanocomposite Aerogels By in Situ Formation of Silica in Cellulose Gel", Angew. Chem. 2012, 124, pp. 2118-2121.
Cerion Nanomaterials, "Precisely Engineered Nanomaterials Developed Specifically for Your Product", downloaded: https://cerionnano.com/materials-b/, 2021, pp. 4.
Demilecamps et al., "Cellulose-Silica Aerogels", Carbohydrate Polymers 122, Published: Jan. 16, 2015, pp. 293-300.
Demilecamps, "Synthesis and Characterization of Polysaccharide-Silica Composite Aerogels for Thermal Superinsulation", Hal Archives-Ouvertes, Published: Feb. 26, 2016, pp. 223.
Feng et al., "Silica-Cellulose Hybrid Aerogels for Thermal and Acoustic Insulation Applications", Colloids and Surfaces A: Physicochemistry Engineering Aspects 506, Published Jun. 27, 2016, pp. 298-305.
He et al., "Aerogels From Quaternary Ammonium-Functionalized Cellulose Nanofibers for Rapid Removal of CR(VI) From Water", Carbohydrate Polymers 111 (2014), pp. 683-687.
Jiang et al., "Cellulose Nanofibril (CNF) Based Aerogels Prepared By a Facile Process and the Investigation of Thermal Insulation Performance", Cellulose 27, Jan. 25, 2020, pp. 6217-6233.
Khalil et al., "A Review on Plant Cellulose Nanofibre-Based Aerogels for Biomedical Applications", Polymers 2020, 12, 1759; DOI:10.3390/POLYM12081759, Aug. 6, 2020, pp. 26.
Long et al., "Cellulose Aerogels: Synthesis, Applications, and Prospects", Polymers 2018, 10, 623; DOI:10.3390/POLYM10060623, pp. 28.
Maleki et al., "An Overview on Silica Aerogels Synthesis and Different Mechanical Reinforcing Strategies", Journal of Noncrystalline Solids 385, (2014), pp. 55-74.
Nita et al., "New Trends in Bio-Based Aerogels", Pharmaceutics 2020, 12, 449; DOI:10.3390/Pharmaceutic S12050449, May 13, 2020, pp. 31.
Padmanabhan et al., "Stiff and Tough Hydrophobic Cellulose-Silica Aerogels From Bacterial Cellulose and Fumed Silica", Process Biochemistry 103, Published: Feb. 14, 2021, pp. 31-38.
Sai et al., "Cellulose-Silica Composite Aerogels Prepared With Sodium Silicate By Freeze Drying Method", Key Engineering Materials; vol. 697, Published: Jul. 4, 2016, pp. 129-133.
International Searching Authority "International Search Report and Written Opinion" From Application No. PCT/US2023/083588, dated Apr. 12, 2024, pp. 18.
Aulin et al., "Aerogels from nanofibrillated cellulose with tunable oleophobicity", Soft Matter, 2010, 6, Published May 14, 2010, pp. 3298-3305.
Casu et al., "Textural characterization of high temperature silica aerogels", Journal of Non-Crystalline Solids, 315, Published 2003, pp. 97-106.
Joshi et al., "Enhancement Studies on Manufacturing and Properties of Novel Silica Aerogel Composites", Gels 2018, 4, 5, Published Jan. 7, 2018, pp. 1-13.
Kazuya et al., "Dynamical transition of heat transport in a physical gel near the sol-gel transition", Scientific Reports, Published Dec 22, 2015, pp. 7.
Pleass, "Some Physical Conditions affecting the Setting of Gelatin and the Bearing of the Results on the Theory of Gel Formation", Proceedings of the Royal Society of London, Series A, Containing Papers of a Mathematical and Physical Character, vol. 126, No. 802, Feb. 3, 1930, pp. 406-426.

* cited by examiner

HANDLING TECHNOLOGY FOR FRAGILE MATERIALS SUCH AS AEROGELS

PRIORITY

This application claims priority to U.S. provisional application No. 63/387,442, filed on Dec. 14, 2022, the entire contents of which are incorporated herein by reference.

FIELD OF THE INVENTION

The present invention relates to apparatuses, systems, and methods for delicate handling of fragile materials, aerogels, fragile sheet-like materials and aerogel sheets.

BACKGROUND OF THE INVENTION

Conventional robot grippers have been used to grip and move objects. Some conventional grippers use suction to grip and move objects. For example, in the glass handling industry, suction cups are commonly used to grip and move glass sheets. However, suction often involves using suction forces on an object. The use of such suction forces is not ideal for handling fragile materials. Other conventional grippers use chemical adhesives to grip and move objects. However, chemical adhesives can require a significant amount of added force to undo an attachment to an object once the adhesive is applied. This can damage fragile materials. Mechanical grippers have also been used, but require higher compressive forces that can damage fragile materials. Other conventional grippers use electroadhesive forces. Such grippers use an electroadhesive surface to grip and move an object. While the use of an electroadhesive force may be more delicate in handling fragile materials. Applicant considers that this force may still pose problems for particularly fragile materials such as aerogels. Even further, conventional electroadhesive grippers and their methods of use are not optimized for use with fragile materials such as aerogel, are not used to apply aerogel onto a glass substrate, are not used to remove aerogel from a mold, and/or are not used to apply aerogel onto a sheet-like substrate.

It would be desirable to provide apparatuses, systems, and methods for delicate handling of fragile materials, such as aerogel. It would also be desirable to provide apparatuses, systems, and methods for delicate handling of fragile sheet-like materials. In particular, it would be desirable to provide apparatuses, systems and methods for delicate handling of aerogel sheets.

SUMMARY OF THE INVENTION

Figure 1:
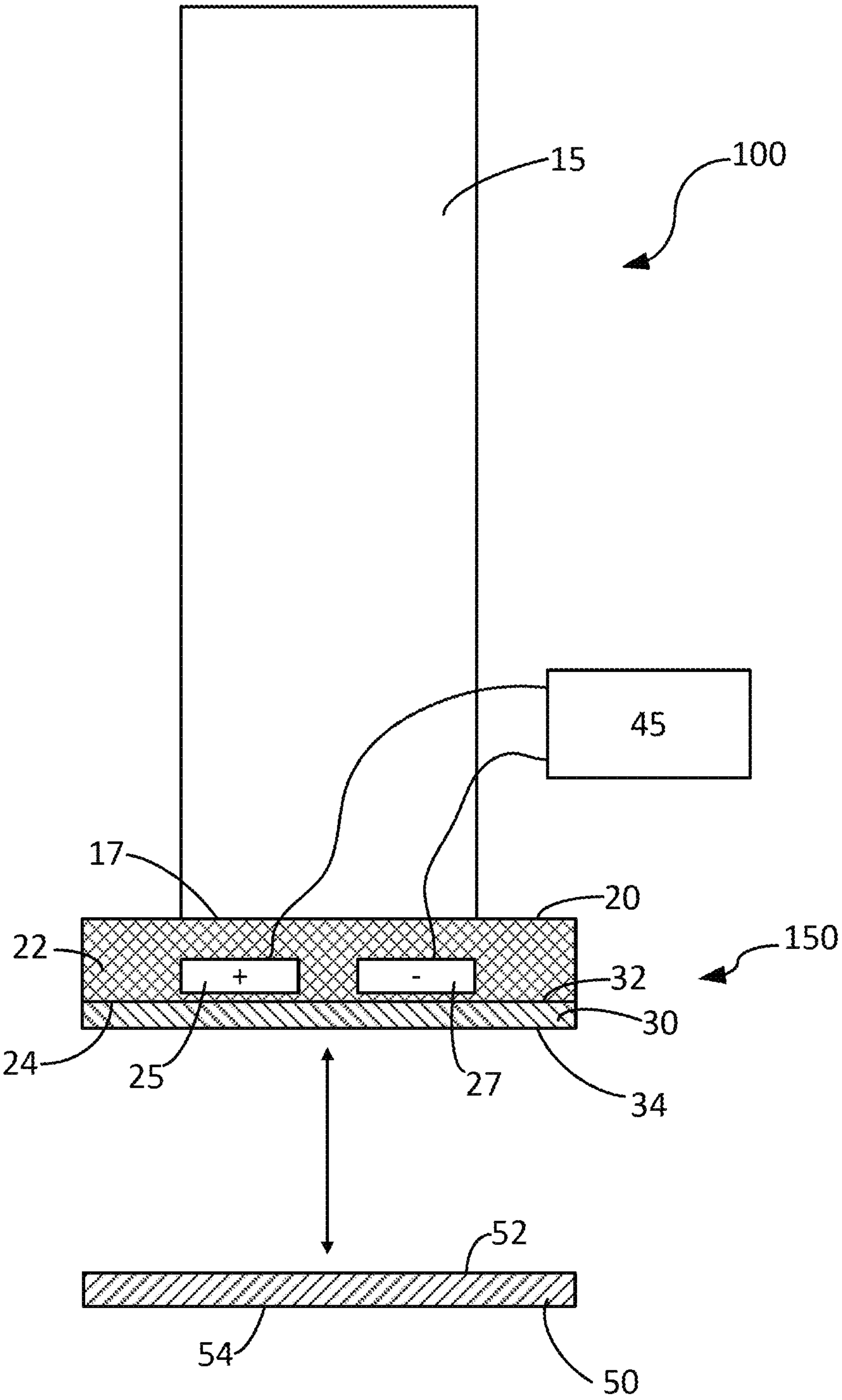
FIG. 1 is schematic illustration of a general handling apparatus according to certain embodiments.

Certain embodiments provide a handling apparatus that includes an electroadhesive gripper assembly comprising gripping electrodes and an aerogel sheet, the aerogel sheet being configured to contact and hold a fragile material. The aerogel sheet can have a hardness of less than 10 MPa and/or a Young's modulus of compression of less than 10 MPa. The aerogel sheet can also have a major dimension of at least 10 cm (e.g., at least 0.375 meter, at least 0.75 meter, at least about 1.125 meters or at least 1.5 meters).

The electroadhesive gripper assembly can include a facing surface and the aerogel sheet can contact an entirety of the facing surface. In some cases, the facing surface has a rectangular shape with a length L1 and a width W1, and the aerogel sheet has a rectangular shape with a length L2 and a width W2, wherein L2≥L1 and W2≥W1. In certain cases, the facing surface has an L1 or W1 of at least at least 10 cm (e.g., at least 0.375 meter, at least 0.75 meter, at least about 1.125 meters or at least 1.5 meters).

The electroadhesive gripper assembly can also include a plurality of electroadhesive grippers with the aerogel sheet being carried alongside the plurality of electroadhesive grippers. The plurality of electroadhesive grippers can also include a plurality of facing surfaces, and the aerogel sheet can contact the plurality of facing surfaces. In some cases, the plurality of facing surfaces is arranged in a rectangular configuration having a length L1 and a width W1, and the aerogel sheet has a rectangular shape with a length L2 and a width W2, wherein L2≥L1 and W2≥W1.

Other embodiments provide a handling system that includes an electroadhesive gripper assembly and a fragile material comprising an aerogel. The electroadhesive gripper assembly can include gripping electrodes and a contact facing. The electroadhesive gripper assembly can also include a plurality of electroadhesive grippers with the aerogel sheet being carried alongside the plurality of electroadhesive grippers.

The contact facing is configured to contact the fragile material. The contact facing also includes a material having a hardness that is equal to or lower than a hardness of the fragile material. For example, the hardness of the contact facing material can be at least 20% lower than the hardness of the fragile material. Also, the contact facing material can have a compression modulus that is equal to or lower than a compression modulus of the fragile material. As an example, the compression modulus of the contact facing material can be at least 20% lower than the compression modulus of the fragile material.

The contact facing and the fragile material can also each have a sheet-like configuration. In some cases, the fragile material is an aerogel sheet. In some cases, the contact facing comprises a first aerogel material and the fragile material comprises a second aerogel material. The first aerogel material and the second aerogel material can have the same composition or have different compositions, such that the first aerogel material is softer than the second aerogel material.

Other embodiments provide a handling system that includes an electroadhesive gripper assembly and an aerogel sheet. The electroadhesive gripper assembly includes gripping electrodes and a contact facing. The contact facing has a gripping surface configured to contact an entirety of a top surface of the aerogel sheet. In some cases, the gripping surface has a surface area that is greater than or equal to a surface area of the top surface of the aerogel sheet. For example, the gripping surface can have a rectangular shape with a length L2 and a width W2, and the top surface of the aerogel sheet can have a rectangular shape with a length L3 and a width W3, wherein L2≥L3 and W2≥W3. In certain cases, the gripping surface has an L2 or W2 of at least at least 10 cm (e.g., at least 0.375 meter, at least 0.75 meter, at least about 1.125 meters or at least 1.5 meters).

The gripping surface can include a material having a compression modulus that is equal to or lower than a compression modulus of the aerogel sheet. For example, the compression modulus of the gripping surface material can be at least 20% lower than the compression modulus of the aerogel sheet. The gripping surface can also comprise a material having a hardness that is equal to or lower than a hardness of the aerogel sheet. As an example, the hardness of the gripping surface material can be at least 20% lower than the hardness of the aerogel sheet. In many cases, the gripping surface is defined by an aerogel.

In some cases, the gripping surface is formed of a first aerogel material and the aerogel sheet is formed of a second aerogel material. The first aerogel material and the second aerogel material can have the same composition or different compositions, such that the first aerogel material is softer than the second aerogel material.

Other embodiments provide a method of handling an aerogel sheet using a handling apparatus having an electroadhesive gripper assembly with a contact facing. The method can comprise moving the electroadhesive gripper assembly so as to position the contact facing alongside an aerogel sheet, such that the aerogel sheet is held alongside the contact facing, moving the electroadhesive gripper assembly together with the aerogel sheet so as to position the aerogel sheet on a glass substrate, and moving the electroadhesive gripper assembly so as to separate the contact facing from the aerogel sheet and leave the aerogel sheet on the glass substrate.

The contact facing can include a material having a compression modulus that is equal to or lower than a compression modulus of the aerogel sheet. For example, the compression modulus of the contact facing material can be at least 20% lower than the compression modulus of the aerogel sheet. The contact facing can also include a material having a hardness that is equal to or lower than a hardness of the aerogel sheet. For example, the hardness of the contact facing material can be at least 20% lower than the hardness of the aerogel sheet.

In some cases, the contact facing can include a first aerogel material and the aerogel sheet can include a second aerogel material. The first aerogel material and the second aerogel material can have the same composition or different compositions, such that the first aerogel material is softer than the second aerogel material.

The method can also include moving the electroadhesive gripper assembly so as to position the contact facing alongside the aerogel sheet, resulting in the contact facing contacting an entirety of a top surface of the aerogel sheet. In some cases, the moving the electroadhesive gripper assembly together with the aerogel sheet so as to position the aerogel sheet on the glass substrate includes pressing the aerogel sheet forcibly against the glass substrate, perhaps with a pressure in the range of 0.1 kPa to 100 kPa. Also, in some cases, the moving the electroadhesive gripper assembly so as to position the contact facing alongside the aerogel sheet is performed while the aerogel sheet is in a mold Likewise, the moving the electroadhesive gripper assembly together with the aerogel sheet includes removing the aerogel sheet from the mold.

Other embodiments provide a method of handling a sheet-like aerogel using a handling apparatus having an electroadhesive gripper assembly with a contact facing. The method can include moving the electroadhesive gripper assembly so as to position the contact facing alongside the sheet-like aerogel, activating the electroadhesive gripper assembly so as to introduce electrostatic forces that hold the sheet-like aerogel alongside the contact facing, moving the electroadhesive gripper assembly together with the sheet-like aerogel so as to position the sheet-like aerogel on a sheet-like substrate, deactivating the electroadhesive gripper assembly to reduce or eliminate the electrostatic forces, and moving the electroadhesive gripper assembly so as to separate the contact facing from the sheet-like aerogel and leave the sheet-like aerogel on the sheet-like substrate.

The contact facing can include a material having a compression modulus that is equal to or lower than a compression modulus of the aerogel sheet. For example, the compression modulus of the contact facing material can be at least 20% lower than the compression modulus of the aerogel sheet. The contact facing can also include a material having a hardness that is equal to or lower than a hardness of the aerogel sheet. For example, the hardness of the contact facing material can be at least 20% lower than the hardness of the aerogel sheet.

In some cases, the contact facing can include a first aerogel material and the aerogel sheet can include a second aerogel material. The first aerogel material and the second aerogel material can have the same composition or different compositions, such that the first aerogel material is softer than the second aerogel material.

The contact facing can also be a sheet-like contact facing. In such cases, the sheet-like contact facing can have a rectangular shape with a length L2 and a width W2, and the sheet-like aerogel can have a rectangular shape with a length L3 and a width W3, wherein L2≥L3 and W2≥W3.

The method can also including moving the electroadhesive gripper assembly so as to position the contact facing alongside the sheet-like aerogel, resulting in the contact facing contacting an entirety of a top surface of the sheet-like aerogel. In some cases, this moving step includes pressing the sheet-like aerogel forcibly against the sheet-like substrate, perhaps with a pressure in the range of 0.1 kPa to 100 kPa. In certain cases, the moving the electrostatic gripper assembly so as to position the contact facing alongside the sheet-like aerogel is performed while the sheet-like aerogel is in a mold. Likewise, the moving the electroadhesive gripper assembly together with the sheet-like aerogel includes removing the sheet-like aerogel from the mold.

Other embodiments provide a method of handling an aerogel sheet using a handling apparatus having an electroadhesive gripper assembly with a contact facing. The method includes positioning the electroadhesive gripper assembly to provide the contact facing at a separation distance (e.g., between 0.5 mm and 5 mm) from the aerogel sheet and activating the electroadhesive gripper assembly so as to introduce electrostatic forces that move the aerogel sheet toward the contact facing and hold the aerogel sheet alongside the contact facing.

In certain embodiments, the method further includes moving the electroadhesive gripper assembly together with the aerogel sheet so as to position the aerogel sheet on a substrate, deactivating the electroadhesive gripper assembly to reduce or eliminate the electrostatic forces, and moving the electroadhesive gripper assembly so as to separate the contact facing from the aerogel sheet and leave the aerogel sheet on the substrate.

The contact facing can include a material having a compression modulus that is equal to or lower than a compression modulus of the aerogel sheet. For example, the compression modulus of the contact facing material can be at least 20% lower than the compression modulus of the aerogel sheet. The contact facing can also include a material having a hardness that is equal to or lower than a hardness of the aerogel sheet. For example, the hardness of the contact facing material can be at least 20% lower than the hardness of the aerogel sheet.

In some cases, the contact facing can include a first aerogel material and the aerogel sheet can include a second aerogel material. The first aerogel material and the second aerogel material can have the same composition or different compositions, such that the first aerogel material is softer than the second aerogel material. In certain cases, the contact facing comprises an aerogel sheet. Such an aerogel sheet of the contact facing can have a rectangular shape with a length L2 and a width W2, and aerogel sheet can have a rectangular shape with a length L3 and a width W3, wherein L2≥L3 and W2≥W3.

In certain cases, the step of activating the electroadhesive gripper assembly so as to introduce electrostatic forces that move the aerogel sheet toward the contact facing results in the contact facing contacting an entirety of a top surface of the aerogel sheet. Further, in some cases, the step of positioning the electroadhesive gripper assembly to provide the contact facing at the separation distance includes holding the contact facing stationary for some time such that said activating the electrostatic gripper assembly so as to introduce electrostatic forces that move the aerogel sheet toward the contact facing includes the aerogel sheet moving relative to the contact facing so as to traverse the separation distance.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

In the present specification, anywhere the terms "comprising" or "comprises" are used, those terms have their ordinary, open-ended meaning. In addition, the disclosure at each such location is to be understood to also disclose that it may, as an alternative, "consist essentially of" or "consist of."

Some materials are stronger in compression than in tension. As used herein, “compression” refers to any force that squeezes a material together and “tension” refers to any force that pulls a material apart. When many fragile materials are subjected to sufficient tension, they are prone to falling apart. However, when some fragile materials are subjected to compression, they are less likely to fall apart than when subjected to sufficient tension. This effect may be even more noticeable when fragile materials are in a sheet-like configuration.

Aerogel is an example of a fragile material that tends to be stronger in compression than in tension. For example, aerogels can withstand quite a bit of compression without falling apart, but may fragment and pulverize when handled by traditional devices that impart sufficient tension. Aerogels also may be more brittle and friable when in a sheet-like configuration, particularly a larger sheet-like configuration.

As used herein, the term “aerogel” refers to a material obtained by combining either a nonfluid colloidal network or a polymer network with a liquid so as to form a gel, and then removing the liquid from the gel and replacing the liquid with a gas or vacuum. The aerogel can be any desired aerogel material. For example, the aerogel can comprise a silica-based aerogel or a cellulose-based aerogel. In some cases, the aerogel is a cellulose-based aerogel. Cellulose-based aerogels are described in U.S. PCT Patent Application Publication No. US2019/0055373, entitled “Bacterial Cellulose Gels, Process for Producing and Methods of Use,” the teachings of which are incorporated herein by reference. Such aerogel can contain cellulosic nanocomposites that are aligned in ordered liquid crystal phases. In other cases, the aerogel is a silica-based aerogel. Silica-based aerogels are described in U.S. Patent Application No. 63/318,165, entitled “Silica Wet Gel and Aerogel Materials,” the teachings of which are incorporated herein by reference.

Known handling apparatuses are not optimal for handling fragile materials. For example, some handling apparatuses use suction to pick up objects. Also, other handling apparatuses use adhesives to pick up objects and then later apply strong tension forces to remove the objects from the adhesive. However, the resulting forces may damage fragile materials.

As result, fragile materials such as aerogel may be damaged when handled by conventional handling devices, particularly when the materials are in a sheet-like configuration. Applicant has therefore invented handling technology that avoids damage to fragile materials, such as aerogel, during handling.

Some embodiments provide an apparatus for handling fragile materials. FIG. 1 illustrates a general schematic drawing for an apparatus 100. The apparatus 100 generally includes a structure 15 bearing an electroadhesive gripper assembly 150. The electroadhesive gripper assembly 150 includes an electroadhesive gripper 20 and a contact facing 30. The contact facing 30 is provided between the electroadhesive gripper 20 and a fragile material 50 to be handled. Typically, the fragile material 50 comprises an aerogel material, for example an aerogel sheet. However, skilled artisans will understand that any fragile material may be handled using the present apparatus.

The contact facing 30 is configured to contact and hold the fragile material 50. The contact facing 30 can generally comprise any suitable material, such as a polymer, a composite, and/or a ceramic (e.g., an oxide of a metal or semi-metal). The contact facing 30 preferably comprises a material that is less prone to damaging the fragile material 50 when coming into contact with it. By providing a contact facing 30 as part of the electroadhesive gripper 20 or between the electroadhesive gripper 20 and the fragile material 50, the fragile material 50 is less prone to damage during handling. Further, the contact facing 30 can advantageously comprise a selected material, and/or can optionally have a specific size and shape, that make it less prone to damaging the fragile material 50 when coming into contact with it. Such an arrangement is particularly desirable when used to handle aerogels, in particular aerogel sheets. Further, the contact facing 30 can be configured as a single structure or as a plurality of structures.

The structure 15 can be any structural part (e.g., any support structure) of a handling apparatus, such as a robotic arm or an overhead gantry. As one example, structure 15 can comprise a platen and/or housing that is attached at a working end of a multi-axis robot arm. When provided, the robot arm can optionally have four or more (e.g., six) axes of rotation. Suitable robot arms are commercially available from Fanuc of Yamanishi, Japan, for example under model number R2000iC/165. Another commercial supplier of suitable robot arms is Grabit, Inc., of Sunnyvale, California, USA. The structure 15 in FIG. 1 is schematic in form and can have any size or shape or configuration suitable for bearing the electroadhesive gripper assembly 150.

In FIG. 1, an electroadhesive gripper assembly 150 having a single support structure 15 and a single electroadhesive gripper 20 is schematically illustrated. However, the handling apparatus 100 can have multiple support structures 15 if desired Likewise, each support structure 15 can support multiple electroadhesive gripper assemblies 150. A variety of different configurations are within the scope of the present invention.

The electroadhesive gripper 20 includes gripping electrodes 25, 27. The gripping electrodes 25, 27 are configured to induce an electrostatic attraction with the fragile material 50 upon application of voltage to the gripping electrodes 25, 27. Any suitable electrode configuration can be provided to induce electrostatic attraction. In some cases, one gripping electrode 25 receives a positive charge and another gripping electrode 27 receives a negative charge. In other cases, the gripping electrode 25 receives a negative charge and the gripping electrode 27 receives a positive charge. Also, while FIG. 1 illustrates a single electrode pair 25, 27, multiple electrode pairs can also be used.

The gripping electrodes 25, 27 are connected to a power supply 45. The power supply 45 can include any system that activates the gripping electrodes 25, 27. For example, the power supply 45 can be configured to provide alternating current (AC) voltage or direct current (DC) voltage. The gripping electrodes 25, 27 are connected to the power supply 45 using any suitable connection mechanism known in the art. For example, the gripping electrodes 25, 27 can be connected to the power supply 45 via wires or perhaps via a wireless connection.

The gripping electrodes 25, 27 are provided as part of the electroadhesive gripper 20 using any suitable configuration. In FIG. 1, the electroadhesive gripper 20 includes a base 22 and the gripping electrodes 25, 27 are embedded within or otherwise contained in the base 22. The base 22 can optionally comprise a platen, a substrate, a housing, and/or a subassembly. When the base 22 includes a platen or substrate, it may comprise a rigid material or perhaps a flexible material, such as a polymeric material.

In other cases, the gripping electrodes 25, 27 are sandwiched between two or more platens or substrates. The platens or substrates can comprise the same material or include different materials. A variety of configurations can be used, as the configuration of the electroadhesive gripper 20 is not limited.

The electroadhesive gripper assembly 150 can include a single electroadhesive gripper or a plurality of electroadhesive grippers. FIGS. 2-10 and 29-31 illustrate embodiments involving a single electroadhesive gripper 20. FIGS. 11-28 and 32-37 illustrate embodiments involving a plurality of electroadhesive grippers 20'. While not shown, each electroadhesive gripper 20' in a plurality includes its own gripping electrodes. Likewise, the electroadhesive gripper assembly 150 can include a single contact facing or a plurality of contact facings. FIGS. 2-28 illustrate embodiments involving a single contact facing 30. FIGS. 29-37 illustrate embodiments involving a plurality of contact facings 30'. These embodiments will be described in more detail later.

Referring back to FIG. 1, the electroadhesive gripper 20 is provided at a connection interface 17 of the structure 15. The connection interface 17 can be any surface or any other component of the structure 15 suitable for bearing an electroadhesive gripper 20. In some cases, the connection interface 17 is located at a distal end of the structure 15. In embodiments where the structure 15 comprises a robot arm, the connection interface 17 may be part of a working end of the robot arm. In embodiments where the structure 15 is part of a gantry, the connection interface 17 may comprise a housing, seam, carriage, and/or shuttle configured to move an electroadhesive gripper 20 along a vertical axis and along at least one horizontal axis.

The electroadhesive gripper 20 can have any desired shape or configuration. For example, the electroadhesive gripper 20 can have a square, rectangular, circular or perhaps hexagonal shape. In the illustrated embodiment, the electroadhesive gripper 20 has a rectangular shape. Preferably, the electroadhesive gripper 20 includes a facing surface 24 that is in contact with a contact facing 30. In some cases, the facing surface 24 is a surface of the electroadhesive gripper 20 furthest from the structure 15. The facing surface 24 can optionally be a substantially planar surface. For example, the facing surface 24 can be a flat surface. The facing surface 24 can also have any desired shape. For example, it can have a square, rectangular, circular or perhaps hexagonal shape. In the illustrated embodiments, the facing surface 24 is a rectangular flat surface.

The contact facing 30 is provided between the facing surface 24 and the fragile material 50. Generally, the contact facing 30 includes two opposed surfaces 32, 34. The opposed surfaces include a connection surface (or rear surface) 32 and a gripping surface (or front surface) 34.

The gripping surface 34 is configured to (e.g., due to operation of the electrodes 25, 27) temporarily hold the fragile material 50. For example, when the electrodes 25, 27 are activated, the electrostatic forces hold the fragile material 50 alongside the gripping surface 34. When the electrodes 25, 27 are deactivated, the gripping surface 34 releases contact with the fragile material 50.

The contact facing 30 can have any desired shape or configuration. For example, it can have a square, rectangular, circular or perhaps hexagonal shape. In the illustrated embodiments, the contact facing 30 has a rectangular shape. In many cases, the contact facing 30 has a sheet-like configuration. For example, the contact facing 30 can be a square sheet, rectangular sheet, or a hexagonal sheet. In certain illustrated embodiments, the contact facing 30 has a rectangular sheet-like configuration. If desired, the contact facing 30 may be partially recessed into a front side of the electroadhesive gripper 20.

The connection surface 32 (or rear surface) of the contact facing 30 can optionally be a substantially planar surface. For example, the connection surface 32 can be a flat surface. The connection surface 32 can also have any desired shape. For example, it can have a square, rectangular, circular or perhaps hexagonal shape. In the illustrated embodiments, the connection surface 32 is a rectangular flat surface. The connection surface 32 contacts the facing surface 24 of the electroadhesive gripper 20.

The contact facing 30 can permanently or temporarily (e.g., releasably) contact the facing surface 24. In some cases, the connection surface 32 is fixedly attached to the facing surface 24 using any desired fixing mechanism. For example, in certain cases, the connection surface 32 is adhered to the facing surface 24. In other cases, the connection surface 32 is mechanically fixed (e.g., clamped or otherwise fastened) to the facing surface 24. In some cases, the connection surface 32 is releasably attached to the facing surface 24. For example, when the contact facing 30 comprises an aerogel sheet, it may need to be replaced periodically. A variety of different attachment mechanisms can be used and are not limited.

The gripping surface 34 (or front surface) of the contact facing 30 can also optionally be a substantially planar surface. For example, the gripping surface 34 can be a flat surface. The gripping surface 34 can also have any desired shape. For example, it can have a square, rectangular, circular or perhaps hexagonal shape. In the illustrated embodiments, the gripping surface 34 is a rectangular flat surface.

The contact facing 30 can also have a selected size. In some cases, the contact facing 30 has a major dimension (e.g., a length or width) of at least 10 cm and less than 3 meters. In certain cases, the contact facing 30 has a major dimension (e.g., a length or width) of at least 0.375 meter, preferably at least about 0.75 meter, or in some cases at least about 1.125 meters (e.g., between about 1.5 meters and about 3 meters).

While the contact facing 30 is described as a single structure, skilled artisans will understand that a plurality of structures can define the contact facing 30. For example, in embodiments where the contact facing is described as an aerogel sheet, skilled artisans will understand that a plurality of aerogel sheets can be used. In some embodiments, the plurality of aerogel sheets can comprise a plurality of spaced apart aerogel sheets. In certain cases, the contact facing 30 comprises four spaced apart aerogel sheets. The four spaced apart aerogel sheets can also be provided at each corner of the facing surface 34. A variety of configurations are possible.

The fragile material 50 can be any desired material that is prone to damage by strong tension forces. In many cases, the fragile material 50 is a sheet-like material. The fragile material 50 can also have any desired sheet-like configuration. For example, the fragile material 50 can be a square sheet, rectangular sheet, or a hexagonal sheet. In the illustrated embodiments, the fragile material 50 is shown as a rectangular sheet.

In certain cases, the fragile material 50 can be sheet having a major dimension (e.g., a length or width) of at least 10 cm and less than 3 meters. In certain cases, the fragile material 50 has a major dimension (e.g., a length or width) of at least 0.375 meter, preferably at least about 0.75 meter, or in some cases at least about 1.125 meters (e.g., between about 1.5 meters and about 3 meters). The present equipment and methods may be particularly advantageous for use with large-area fragile materials, which may have a major dimension of greater than 0.9 meter, greater than 1.2 meters, or even greater than 1.5 meters. Any embodiment of the present equipment and methods can optionally involve handing an aerogel sheet having a major dimension in any of these ranges while being less than 3 meters.

The fragile material 50 has two opposed surfaces 52, 54. The opposed surfaces can include a first surface 52 and a second surface 54. Generally, the gripping surface 34 of the contact facing 30 grips (i.e., is held forcibly against) the first surface 52 during handling. In some cases, the contact facing 30 is held forcibly against the first surface 52 with a pressure in the range of 0.1 kPa to 100 kPa.

In many cases, the fragile material 50 comprises an aerogel. Further, the aerogel can optionally comprise a silica-based aerogel or a cellulose-based aerogel. Any other aerogel type can also be used. In certain cases, the fragile material 50 comprises an aerogel sheet. This is in contrast to aerogel in flowable granular or otherwise particulate form. An aerogel sheet is preferably self-supporting, i.e., once fully synthesized and formed, the sheet can retain sheet form without being adhered to glass or another support. The aerogel sheet can also have any desired sheet-like configuration. For example, the aerogel sheet can be a square sheet, rectangular sheet, or a hexagonal sheet. Also, the aerogel sheet can have a larger size as discussed above.

In certain embodiments, the aerogel sheet has been previously dried using a conventional aerogel drying method. In many cases, a wet gel material is placed in either a freeze dryer, a supercritical dryer, or an ambient dryer. In some cases, the wet gel material is dried using a supercritical drying method (also known as a critical point drying method). As is well-known to skilled artisans, supercritical drying involves a solvent exchange. Specifically, the water initially inside the wet gel material layer is replaced with a suitable organic solvent (e.g., methanol, ethanol, or acetone). The wet gel material is then placed in a pressure vessel along with liquid carbon dioxide. The pressure vessel may be filled with, and emptied of, liquid carbon dioxide multiple times, so as to remove the organic solvent and leave liquid carbon dioxide in its place. The liquid carbon dioxide is then heated past its critical temperature and pressure and removed, thereby leaving an aerogel material.

In other cases, the wet gel material is dried using an ambient drying method. As used herein, ambient drying involves drying the flexible gel layer under ambient conditions (e.g., at a temperature in a range of from about 50 degrees to about 85 degrees Fahrenheit, and more typically in a range of from 68 degrees to 72 degrees Fahrenheit). The liquid in the wet gel material is allowed to slowly evaporate under controlled conditions, leaving an aerogel material. The controlled conditions ensure that the evaporation is slow enough so that the silica network of the gel does not collapse during the drying. With ambient drying, the dryer is configured to establish a controlled environment in its interior. This may involve a controlled temperature, a controlled pressure, a controlled airflow, a controlled humidity, or any combination thereof.

In still other cases, the wet gel material is dried using a freeze drying method. The wet gel material is frozen and then put into a vacuum chamber. The solvent is then removed to leave an aerogel material. Any suitable freezing technique known in the art may be used. As non-limiting examples, the wet gel material can be placed into a household freezer, liquid nitrogen, or in a cryogenic mixture (e.g., a dry-ice/solvent mixture, such as a dry-ice and acetone bath).

By providing the contact facing 30 with selected materials and/or configurations, damage to the fragile material 50 during handling can be minimized. For example, the contact facing 30 preferably comprises a selected material that is less prone to damaging the fragile material 50 when coming into contact with it.

In some cases, the contact facing 30 comprises a material that is as soft or softer than the fragile material 50. In other words, the contact facing 30 can comprise a material having a hardness that is equal to or lower than a hardness of the fragile material. In certain cases, the hardness of the contact facing material is at least 5%, at least 10%, at least 15% or perhaps at least 20% lower than the hardness of the fragile material. Preferably, the material of the contact facing 30 has a hardness of less than 10 MPa.

The hardness measure can be determined using any suitable technique and mechanism. If desired, the hardness can be measured by obtaining microindentation measurements for a material and then calculating a hardness value from those measurements. For example, the hardness measure can be obtained using a method described in M. Moner-Girona et al. *Journal of Non-Crystalline Solids* 285 (2001) 244-250, the contents of which are incorporated herein by reference.

Additionally or alternatively, the contact facing 30 can comprise a material having a compression modulus that is equal to or lower than a compression modulus of the fragile material 50. For example, in some cases, the compression modulus of the contact facing material is at least 5%, at least 10%, at least 15% or at least 20% lower than the compression modulus of the fragile material. The compression modulus measure can be determined using any suitable technique and mechanism. In certain cases, compression modulus is reported as a Young's Modulus for compression. Further, in certain embodiments, the Young's Modulus for compression of the contact facing material is less than 10 MPa.

The Young's Modulus for compression can be measured by obtaining microindentation measurements for a material and then calculating a Young's Modulus from those measurements. In certain embodiments, the Young's Modulus is obtained using a method described in M. Moner-Girona et al. *Journal of Non-Crystalline Solids* 285 (2001) 244-250.

In some cases, the contact facing 30 is formed of a first aerogel material and the fragile material 50 is a formed of a second aerogel material. The first and second aerogel materials can have the same composition or different compositions. In certain cases, the first aerogel material is as soft or softer than the second aerogel material. In other words, the first aerogel material can have a hardness that is equal to or lower than a hardness of the second aerogel material. In certain cases, the hardness of the first aerogel material is at least 5%, at least 10%, at least 15% or perhaps at least 20% lower than the hardness of the second aerogel material. In certain embodiments, the first aerogel material has a hardness of less than 10 MPa.

Additionally or alternatively, the first aerogel material can have a compression modulus that is equal to or lower than a compression modulus of the second aerogel material. For example, in some cases, the compression modulus of the first aerogel material is at least 5%, at least 10%, at least 15% or at least 20% lower than the compression modulus of the second aerogel material. In certain embodiments, the first aerogel material has a Young's Modulus for compression of less than 10 MPa.

In many cases, the fragile material 50 has a sheet-like configuration, and the contact facing 30 also has a sheet-like configuration. Further, the contact facing 30 can be optionally have the same general sheet-like configuration as the fragile material 50. For example, in the illustrated embodiments, each of the contact facing 30 and the fragile material 50 is configured as a rectangular sheet.

The contact facing 30 can also have a selected size. In some cases, the size is selected such that the connection surface 32 contacts or otherwise spans the entire facing surface 24. In such cases, when the connection surface 32 is in contact with or otherwise spans the facing surface 24, no part of the facing surface 24 is exposed. This configuration ensures that the fragile material 50 will not come into direct contact with the facing surface 24, but rather will only contact the gripping surface 34 of the contact facing 30. This may be desirable in cases where the contact facing 30 comprises a material that is less prone to damaging the fragile material 50 when coming into contact with it.

In some embodiments, the contact facing has a gripping surface 34 with a desired shape and the fragile material has a surface 52 with the same desired shape as the gripping surface 34. In the illustrated embodiment, both the gripping surface 34 and the surface 52 have a rectangular shape. Of course, other shapes can be used.

The contact facing 30 can optionally have a gripping surface 34 configured to contact an entire surface 52 (e.g, a top surface) of the fragile material 50. In some embodiments, during handling, the gripping surface 34 contacts the entire surface 52 of the fragile material 50, such that no part of the surface 52 is exposed. In some cases, the gripping surface 34 has a surface area that is equal to or greater than the surface area of the surface 52. Such configurations may help ensure that when the gripping surface 34 contacts the surface 52, resulting handling forces are more evenly distributed across the surface 52. This may help minimize damage during handling, particularly when the fragile material 50 has a sheet-like configuration.

In other embodiments, the contact facing 30 can optionally have a gripping surface 34 configured to contact only a portion of the top surface 52 of the fragile material. In some cases, the gripping surface 34 has a surface area that is less than the surface area of the surface 52. For example, the gripping surface 34 has a surface area that is less than 50%, less than 40%, less than 30% or perhaps less than 20% of the surface area of the surface 52.

The embodiments of FIGS. 2-34 will now be described in more detail. FIGS. 2-34 illustrate exemplary embodiments showing different arrangements of an electroadhesive gripper 20 (or a plurality of electroadhesive grippers 20') and contact facing 30 (or a plurality of contact facings 30') of an electroadhesive gripper assembly 150. The electroadhesive gripper(s) and contact facing(s) can include any features described with reference to FIG. 1 or elsewhere herein.

FIGS. 2-10 show a single electroadhesive gripper 20. FIGS. 11-28 and 32-37 show a plurality of electroadhesive grippers 20'. The plurality of electroadhesive grippers 20' can each include features described with reference to the single electroadhesive gripper 20 of FIG. 1 or elsewhere herein. Each electroadhesive gripper 20' in the plurality can have any desired shape or configuration. Typically, each electroadhesive gripper 20' will have the same configuration, although this is by no means required. For example, each electroadhesive gripper 20' can have a square, rectangular, circular or perhaps hexagonal shape. In the illustrated embodiments, each electroadhesive gripper 20' has a rectangular shape but other shapes can be also be used.

The plurality of electroadhesive grippers 20' have a plurality of facing surfaces 24'. Each facing surface 24' can have any desired shape, such as a square, rectangle, circle, or perhaps hexagon. Each facing surface 24' can also optionally be a substantially planar surface. Further, all facing surfaces 24' can be in the same plane so they all are configured to simultaneously contact the contact facing(s). In the illustrated embodiments, the facing surfaces 24' are rectangular flat surfaces.

The plurality of electroadhesive grippers 20' can be arranged using a variety of configurations. In some embodiments, such as those shown in FIGS. 11-19, a plurality of electroadhesive grippers 20' are provided with each electroadhesive gripper 20' being positioned alongside and in contact with one or more other electroadhesive grippers 20'. In FIGS. 11-19, there are no gaps in between contiguous electroadhesive grippers 20'. In other embodiments, such as those shown in FIGS. 20-28 and 32-37, each electroadhesive gripper 20' is spaced from one or more other electroadhesive grippers 20' by a gap G.

The plurality of facing surfaces 24' has a length L1 and a width W1. In embodiments not including a gap, such as FIGS. 11-19, the length L1 is simply the combined length of the facing surfaces 24' along a longitudinal axis, and the width W1 is simply the combined width of the facing surfaces 24' along a transverse axis.

In embodiments including a gap, such as FIGS. 20-28 and 32-37, the length L1 is the combined length of the facing surfaces 24' plus the combined length of the gap(s) G along the same axis. Likewise, the width W1 is the combined width of the facing surfaces 24', plus the combined width of the gap(s) G along the same axis. This length and width measurement protocol can be appreciated by referring to FIGS. 21-22, 24-25, 27-28, 33-34 and 36-37.

FIGS. 2-28 show a single contact facing 30. FIGS. 29-37 show a plurality of contact facings 30'. The plurality of contact facings 30' each include features described with reference to the single contact facing 30 of FIG. 1 or elsewhere herein. Each contact facing 30' in the plurality can have any desired shape or configuration. Typically, each contact facing 30' will have the same configuration, although this is by no means required. For example, each contact facing 30' can have a square, rectangular, circular or perhaps hexagonal shape. In the illustrated embodiments, each contact facing 30' has a rectangular shape but other shapes can be also be used. The contact facings 30' can each have a selected size. In some cases, the size for each contact facing is the same, although this is by no means required.

Preferably, each contact facing 30' includes a connection surface 32' that is in contact with a facing surface. Each connection surface 32' can optionally be a substantially planar surface. Each connection surface 32' can also have any desired shape, such as a square, rectangle, circle, or perhaps hexagon. Further, all connection surfaces 32' can be in the same plane so they all are configured to simultaneously contact the facing surface 24 or plurality of facing surfaces 24'. In the illustrated embodiments, the connection surfaces 32' are rectangular flat surfaces.

Each contact facing 30' in a plurality includes a gripping surface 34' configured to contact a top surface 52 of the fragile material 50. Here too, each gripping surface 34' can optionally be a substantially planar surface. Each gripping surface 34' can also have any desired shape, such as a square, rectangle, circle, or perhaps hexagon. Further, all gripping surface 34' can be in the same plane so they all are configured to simultaneously contact the top surface 52. In the illustrated embodiments, the gripping surfaces 34' are rectangular flat surfaces.

In some embodiments, the plurality of contact facings 30' have gripping surfaces 34' configured to contact only a portion of the top surface 52 of the fragile material. In some cases, the gripping surfaces 34' in the plurality have a combined surface area in contact with the top surface 52. In some cases, this combined surface area is less than the surface area of the surface 52. For example, the combined surface area can be less than 50%, less than 40%, less than 30% or perhaps less than 20% of the surface area of the surface 52.

Figure 29:
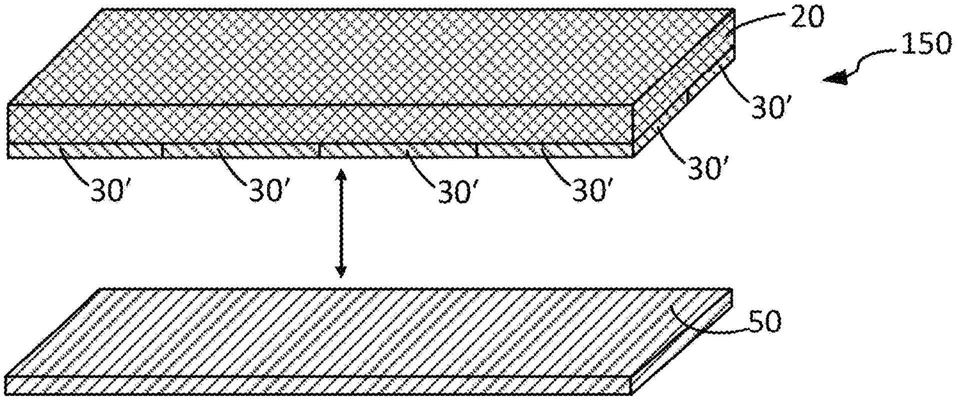
FIG. 29 illustrates a perspective view of an electroadhesive gripper assembly relative to a fragile material according to another embodiment.
Figure 30:
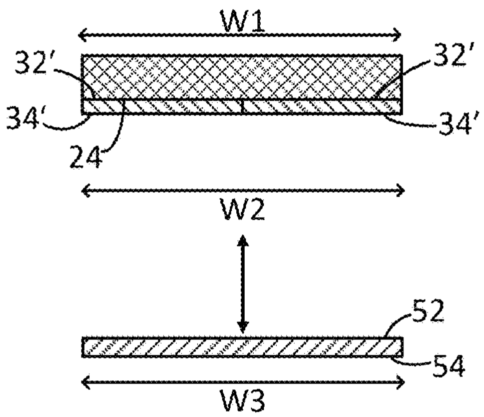
FIG. 30 is a side view of the components shown in FIG. 29.
Figure 31:
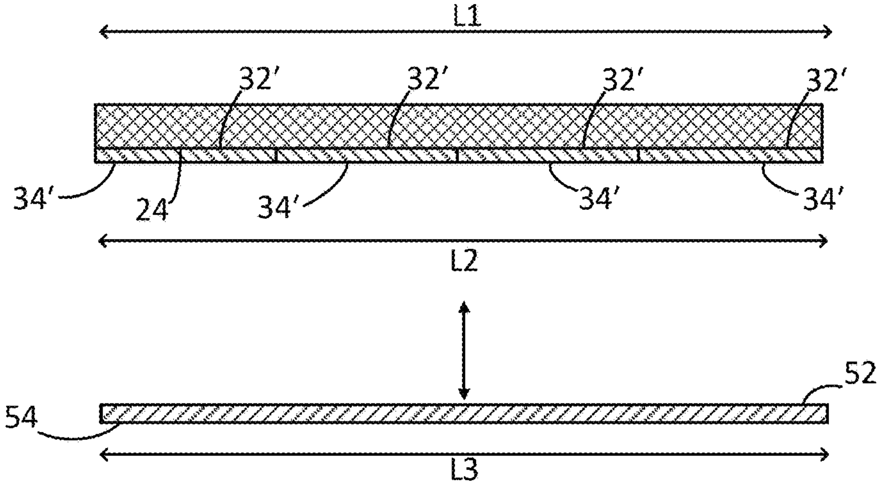
FIG. 31 is a front view of the components shown in FIGS. 29-30.

The plurality of contact facings 30' can also be arranged using a variety of configurations. In some embodiments, such as those shown in FIGS. 29-31, a plurality of contact facings 30' are provided with each contact facing 30' being positioned alongside and in contact with one or more other contact facings 30'. In FIGS. 29-31, there are no gaps in between contiguous contact facings 30'. In other embodiments, such as those shown in FIGS. 32-37, each contact facing 30' is spaced from one or more other contact facings 30'. Each contact facing 30' is spaced from one or more other contact facings 30' by a gap G.

The plurality of contact facings 30' has a length L2 and a width W2. In embodiments not including a gap, such as FIGS. 29-31, the length L2 is simply the combined length of the contact facings 30' along a longitudinal axis, and the width W2 is simply the combined width of the contact facings 30' along a transverse axis. In embodiments including a gap, such as FIGS. 32-37, the length L2 is the combined length of the contact facings 30' plus the combined length of the gap(s) along the same axis. Likewise, the width W2 is the combined width of the contact facings 30', plus the combined width of the gap(s) along the same axis. This length and width measurement protocol can be appreciated by referring to FIGS. 33-34 and 36-37.

Figure 2:
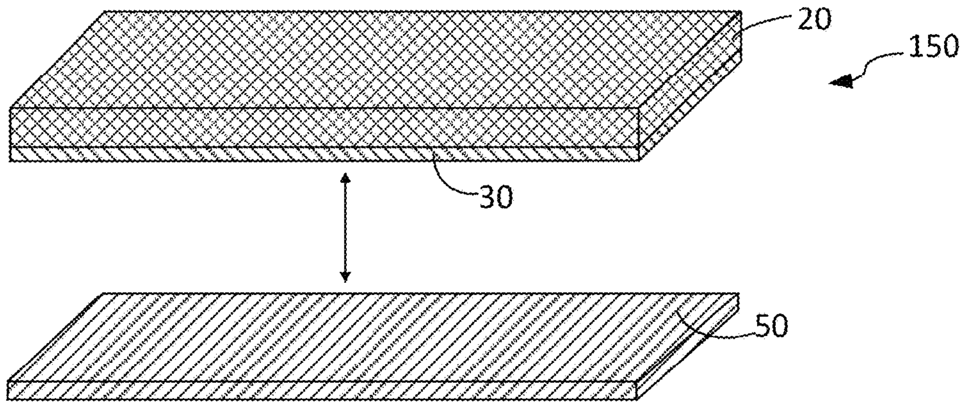
FIG. 2 is a perspective view of an electroadhesive gripper assembly relative to a fragile material according to an embodiment.
Figure 3:
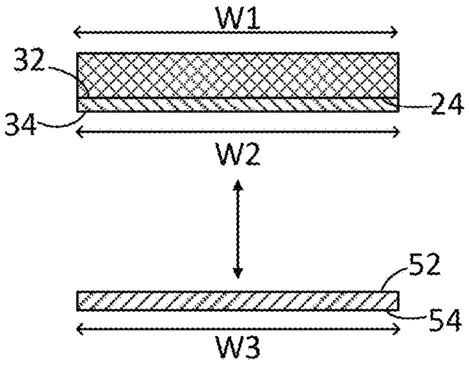
FIG. 3 is a side view of the components shown in FIG. 2.
Figure 4:
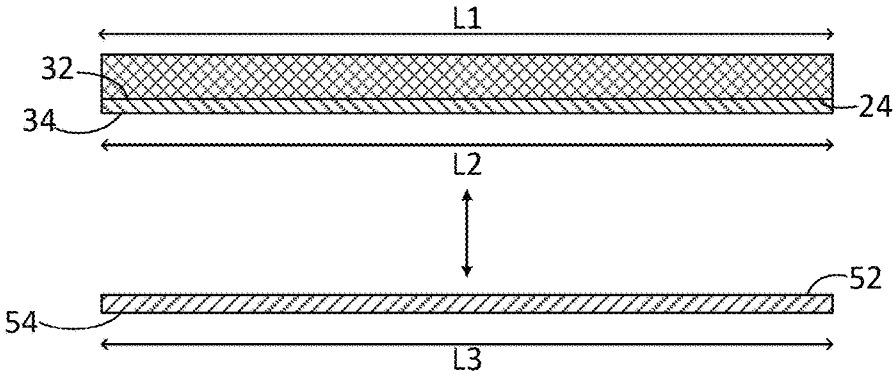
FIG. 4 is a front view of the components shown in FIGS. 2-3.

Specific embodiments will now be described. FIGS. 2-4 illustrate a single contact facing 30 relative to a single electroadhesive gripper 20 and a fragile material 50 according to certain embodiments. The single facing surface 24 has a length L1 and width W1. The contact facing 30 has a length L2 and a width W2, and the fragile material 50 has a length L3 and a width W3. L1 and L2 and L3 are equal (i.e., L1=L2=L3). Likewise, W1 and W2 and W3 are equal (i.e., W1=W2=W3). In this embodiment, the contact facing 30 has a length L2 and a width W2 that equal the length L1 and width W1 of the facing surface 24. Also, the connection surface 32 of the contact facing 30 is shown having a surface area that is equal to a surface area of the facing surface 24. Further, the contact facing 30 has a length L2 and a width W2 that equal the length L3 and width W3 of the surface 52 of the fragile material 50. Also, the gripping surface 34 of the contact facing 30 is shown having a surface area that is equal to a surface area of the surface 52.

Figure 5:
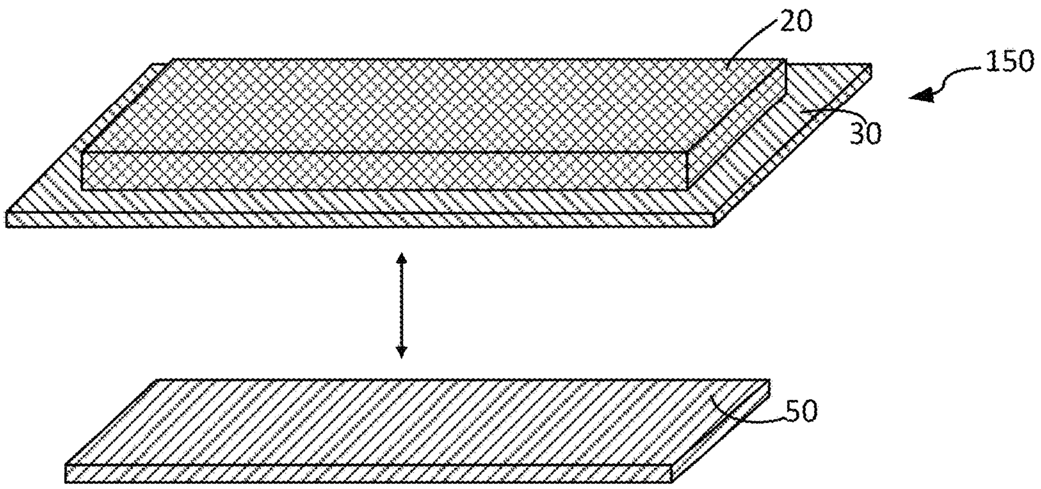
FIG. 5 is a perspective view of an electroadhesive gripper assembly relative to a fragile material according to another embodiment.
Figure 6:
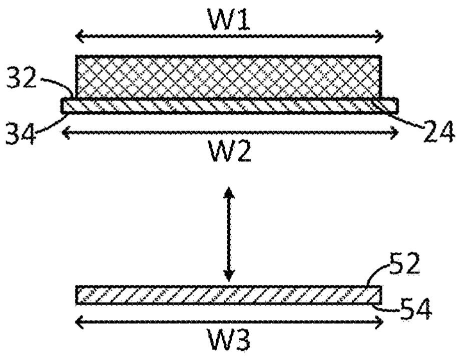
FIG. 6 is a side view of the components shown in FIG. 5.
Figure 7:
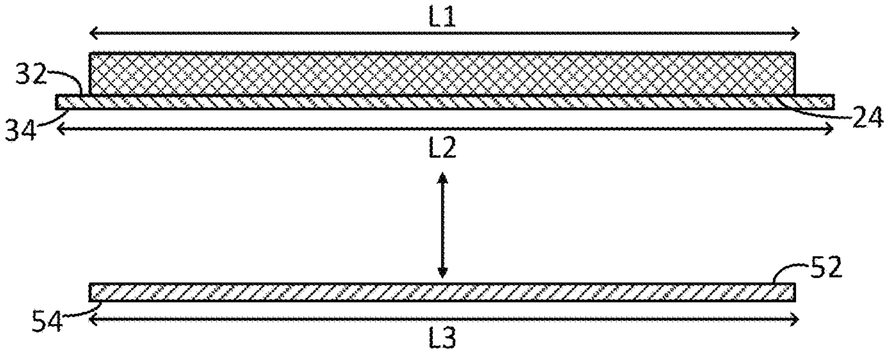
FIG. 7 is a front view of the components shown in FIGS. 5-6.

FIGS. 5-7 illustrate a single contact facing 30 relative to a single electroadhesive gripper 20 and a fragile material 50 according to another embodiment. As shown, L1 and L3 are equal (i.e., L1=L3). Likewise, W1 and W3 are equal (i.e., W1=W3). L2 is greater than both L1 and L3 (i.e., L2>L1, L3). Also, W2 is greater than both W1 and W3 (i.e., W2>W1, W3). In this embodiment, the contact facing 30 has a length L2 and a width W2 that are greater than the length L1 and width W1 of the facing surface 24. Also, the connection surface 32 of the contact facing 30 is shown having a surface area that is greater than a surface area of the facing surface 24. Further, the contact facing 30 has a length L2 and a width W2 that are greater than the length L3 and width W3 of the surface 52 of the fragile material 50. Also, the gripping surface 34 of the contact facing 30 is shown having a surface area that is greater than a surface area of the surface 52.

Figure 8:
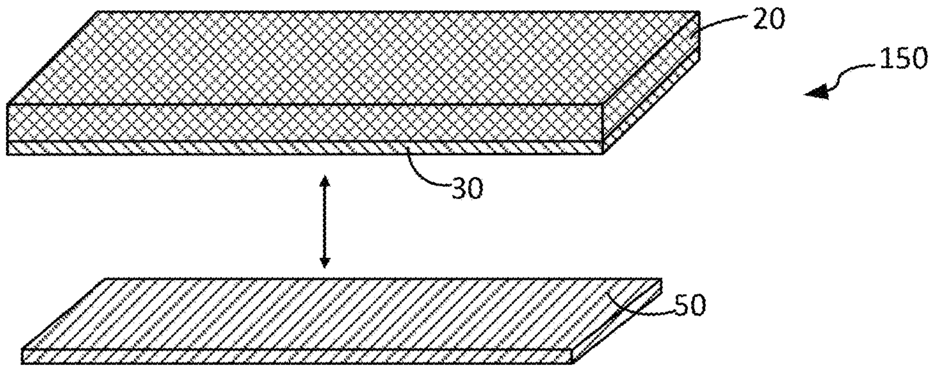
FIG. 8 is a perspective view of an electroadhesive gripper assembly relative to a fragile material according to another embodiment.
Figure 9:
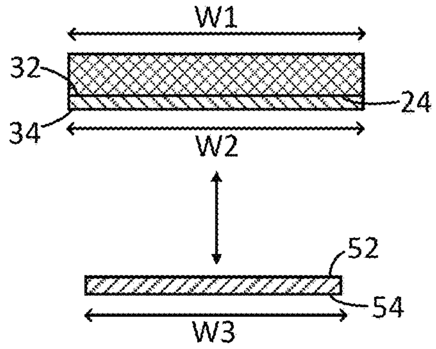
FIG. 9 is a side view of the components shown in FIG. 8.
Figure 10:
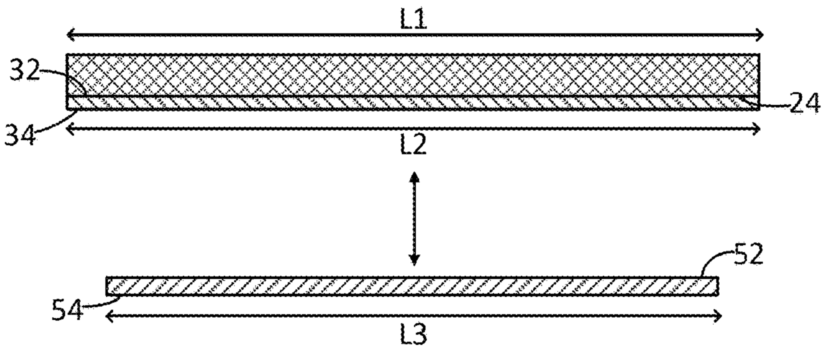
FIG. 10 is a front view of the components shown in FIGS. 8-9.

FIGS. 8-10 illustrate a single contact facing 30 relative to a single electroadhesive gripper 20 and a fragile material 50 according to another embodiment. As shown, L1 and L2 are equal (i.e., L1=L2). Likewise, W1 and W2 are equal (i.e., W1=W2). Further, L1 and L2 are each greater than L3 (i.e., L1, L2>L3). Also, W1 and W2 are greater than W3 (i.e., W1, W2>W3). Here, the contact facing has a length L2 and a width W2 that are equal to the length L1 and width W1 of the facing surface 24. Also, the connection surface 32 of the contact facing 30 is shown having a surface area that is equal to a surface area of the facing surface 24. Further, the contact facing 30 has a length L2 and a width W2 that are greater than the length L3 and width W3 of the surface 52 of the fragile material 50. Also, the gripping surface 34 of the contact facing 30 is shown having a surface area that is greater than a surface area of the surface 52.

Figure 11:
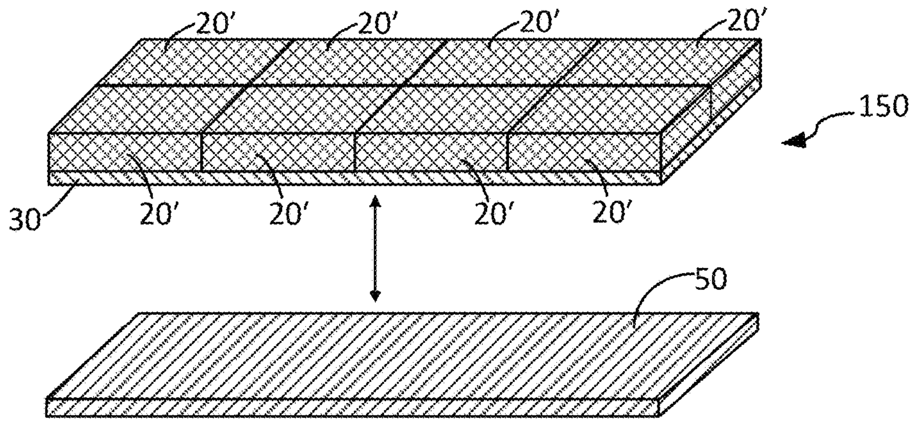
FIG. 11 illustrates a perspective view of an electroadhesive gripper assembly relative to a fragile material according to another embodiment.
Figure 12:
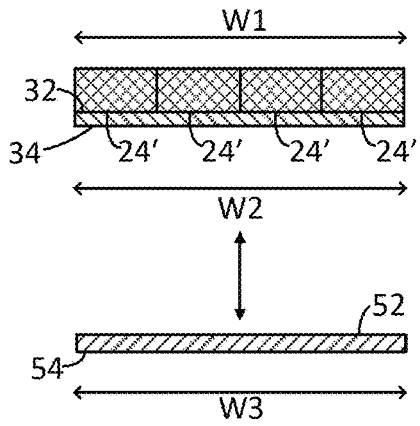
FIG. 12 is a side view of the components shown in FIG. 11.
Figure 13:
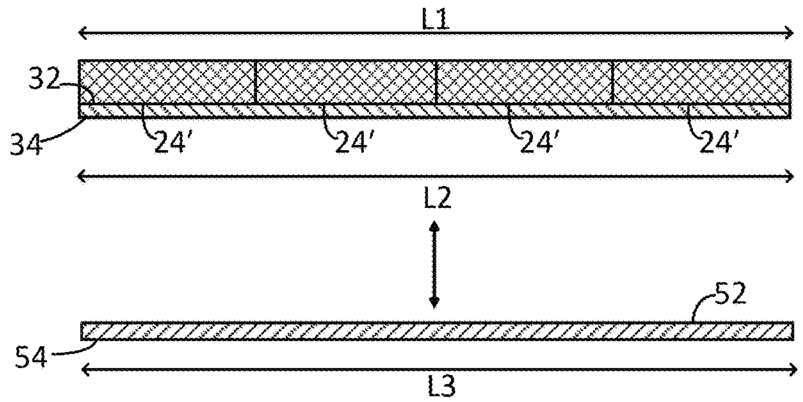
FIG. 13 is a front view of the components shown in FIGS. 11-12.

FIGS. 11-13 illustrate a single contact facing 30 relative to a plurality of electroadhesive grippers 20' and a fragile material 50 according to one embodiment. This embodiment shows eight electrostatic grippers 20', but any other number can alternatively be provided. The illustrated grippers 20' each have a rectangular sheet-like configuration. Further, the plurality of electroadhesive grippers 20' is arranged to form a combined rectangular sheet-like configuration. As shown, L1, L2 and L3 are all equal (i.e., L1=L2=L3) Likewise, W1, W2 and W3 are all equal (i.e., W1=W2=W3). In this embodiment, the contact facing 30 has a length L2 and a width W2 that equal the length L1 and width W1 of the facing surfaces 24'. Also, the connection surface 32 of the contact facing 30 is shown having a surface area that is equal to a surface area of the combined facing surfaces 24'. Further, the contact facing 30 has a length L2 and a width W2 that equal the length L3 and width W3 of the surface 52 of the fragile material 50. Also, the gripping surface 34 of the contact facing 30 is shown having a surface area that is equal to a surface area of the surface 52.

Figure 14:
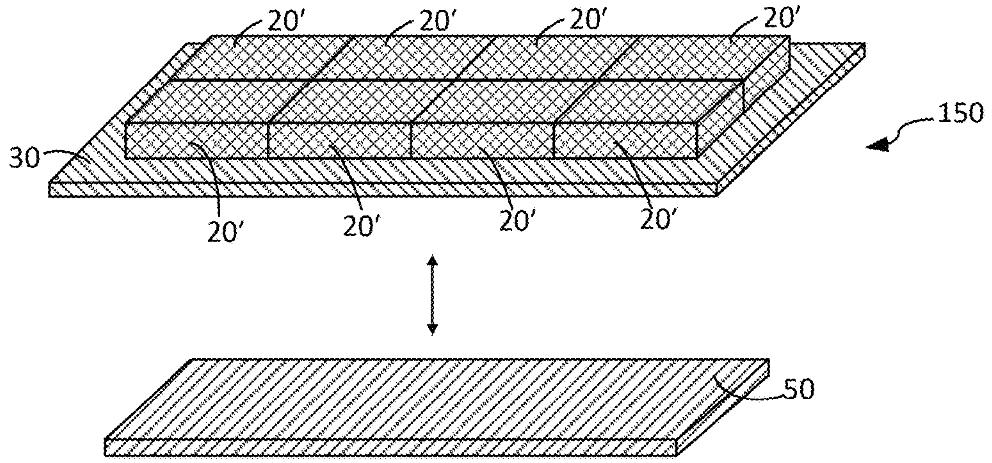
FIG. 14 illustrates a perspective view of an electroadhesive gripper assembly relative to a fragile material according to another embodiment.
Figure 15:
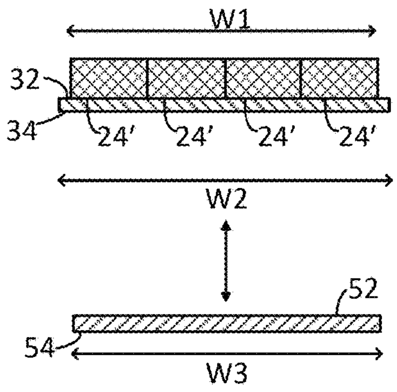
FIG. 15 is a side view of the components shown in FIG. 14.
Figure 16:
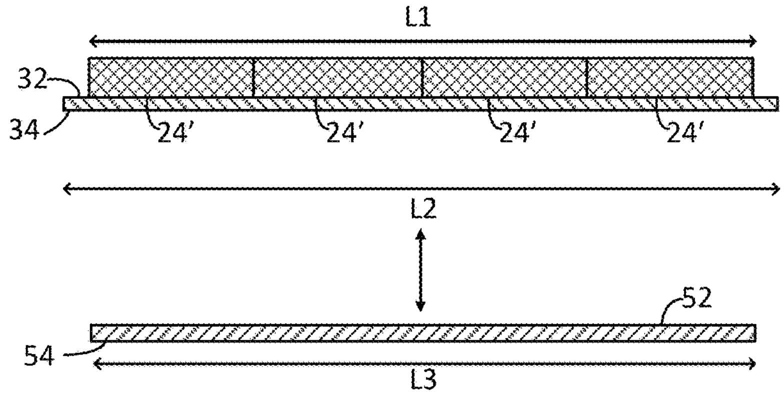
FIG. 16 is a front view of the components shown in FIGS. 14-15.

FIGS. 14-16 illustrate a single contact facing 30 relative to a plurality of electroadhesive grippers 20' and a fragile material 50 according to another embodiment. This embodiment also shows eight electrostatic grippers 20' arranged to form a combined rectangular sheet-like configuration. L1 and L3 are equal (i.e., L1=L3). Likewise, W1 and W3 are equal (i.e., W1=W3). L2 is greater than both L1 and L3 (i.e., L2>L1, L3). Also, W2 is greater than both W1 and W3 (i.e., W2>W1, W3). In this embodiment, the contact facing 30 has a length L2 and a width W2 that are greater than the length L1 and width W1 of the facing surfaces 24'. Also, the connection surface 32 is shown having a surface area that are greater than a surface area of the combined facing surfaces 24'. Further, the contact facing 30 has a length L2 and a width W2 that are greater than the length L3 and width W3 of the surface 52 of the fragile material 50. Also, the gripping surface 34 is shown having a surface area that is greater than a surface area of the surface 52.

Figure 17:
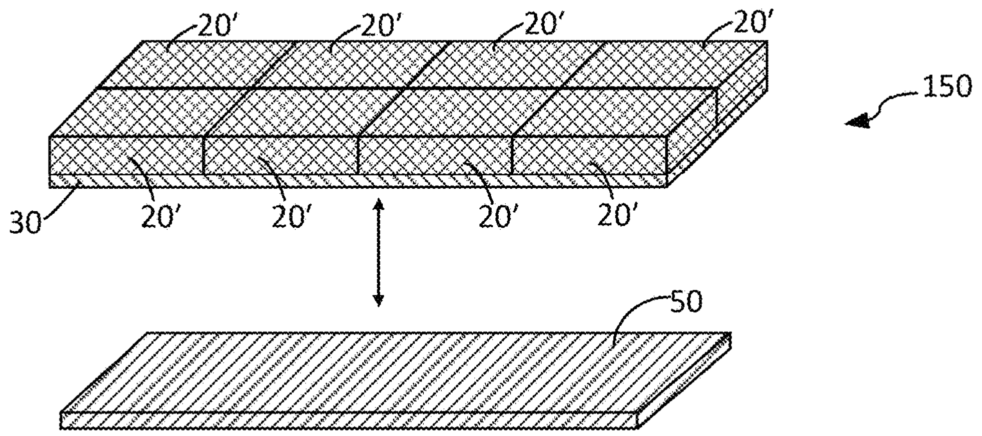
FIG. 17 illustrates a perspective view of an electroadhesive gripper assembly relative to a fragile material according to another embodiment.
Figure 18:
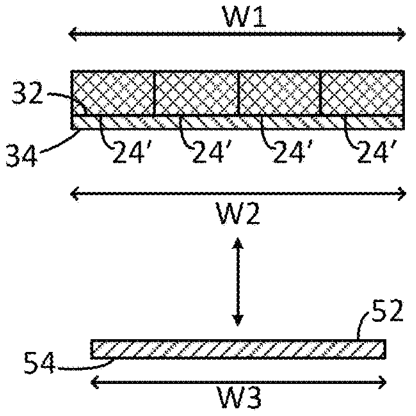
FIG. 18 is a side view of the components shown in FIG. 17.
Figure 19:
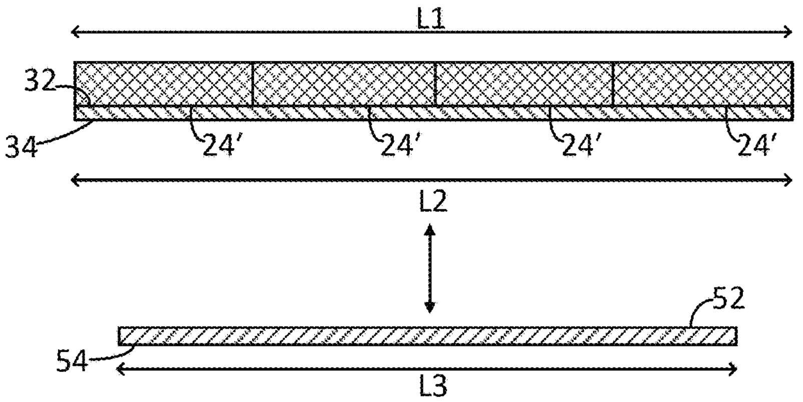
FIG. 19 is a front view of the components shown in FIGS. 17-18.

FIGS. 17-19 illustrate a single contact facing 30 relative to a plurality of electroadhesive grippers 20' and a fragile material 50 according to another embodiment. This embodiment also shows eight electrostatic grippers 20' arranged to form a combined rectangular sheet-like configuration. L1 and L2 are equal (i.e., L1=L2). Likewise, W1 and W2 are equal (i.e., W1=W2). Further, L1 and L2 are each greater than L3 (i.e., L1, L2>L3). Also, W1 and W2 are greater than W3 (i.e., W1, W2>W3). In this embodiment, the contact facing 30 has a length L2 and a width W2 that are equal to the length L1 and width W1 of the facing surfaces 24'. Also, the connection surface 32 is shown having a surface area that is equal to a surface area of the combined facing surfaces 24'. Further, the contact facing 30 has a length L2 and a width W2 that are greater than the length L3 and width W3 of the surface 52. Further, the gripping surface 34 is shown having a surface area that is greater than a surface area of the surface 52.

Figure 20:
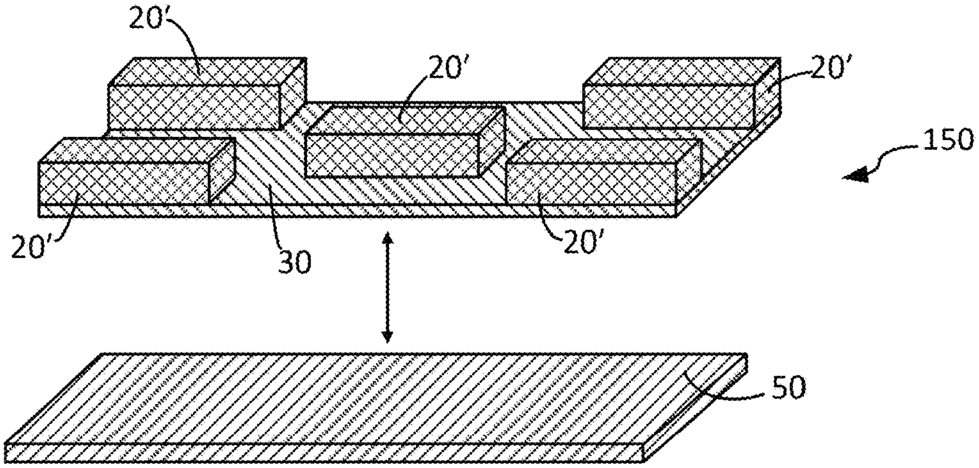
FIG. 20 illustrates a perspective view an electroadhesive gripper assembly relative to a fragile material according to another embodiment.
Figure 21:
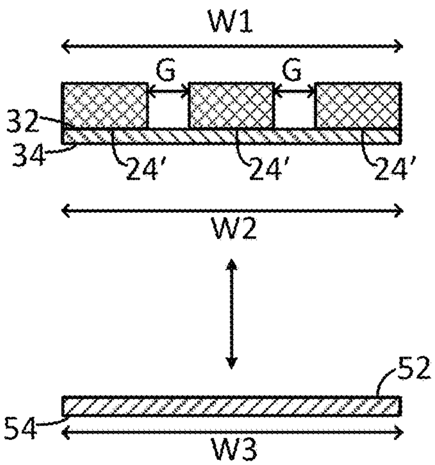
FIG. 21 is a side view of the components shown in FIG. 20.
Figure 22:
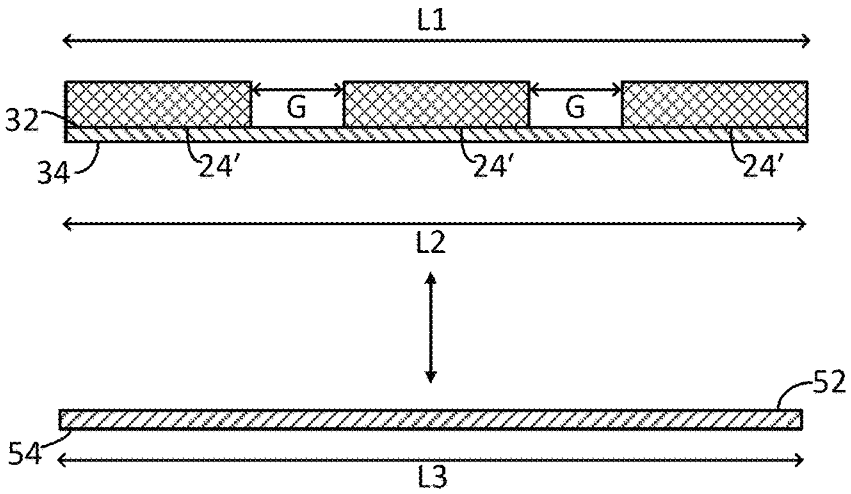
FIG. 22 is a front view of the components shown in FIGS. 20-21.

FIGS. 20-22 illustrate a single contact facing 30 relative to a plurality of electroadhesive grippers 20' and a fragile material 50 according to another embodiment. In this embodiment, a plurality of electroadhesive grippers 20' is provided, and each electroadhesive gripper 20' is spaced apart from other electroadhesive grippers 20' by gaps G. This embodiment shows five electrostatic grippers 20', but any other number can alternatively be provided. Each electroadhesive gripper 20' is positioned alongside and in contact with one or more other electroadhesive grippers 20'. There are no gaps in between contiguous electroadhesive grippers 20'. The illustrated grippers 20' each have a rectangular configuration. The illustrated plurality of facing surfaces 24' in combination with the gaps G have a length L1 and a width W1. The length L1 is the combined length of the facing surfaces 24' and the gap lengths in the longitudinal direction. Likewise, the width W1 is the combined width of the facing surfaces 24' and the gap widths in the transverse direction. As shown, L1, L2 and L3 are all equal (i.e., L1=L2=L3). Likewise, W1, W2 and W3 are all equal (i.e., W1=W2=W3). In this embodiment, the contact facing 30 has a length L2 and a width W2 that equal the length L1 and width W1. Further, the contact facing 30 has a length L2 and a width W2 that equal the length L3 and width W3 of the surface 52 of the fragile material 50. Here too, the gripping surface 34 of the contact facing 30 is shown having a surface area that is equal to a surface area of the surface 52.

Figure 23:
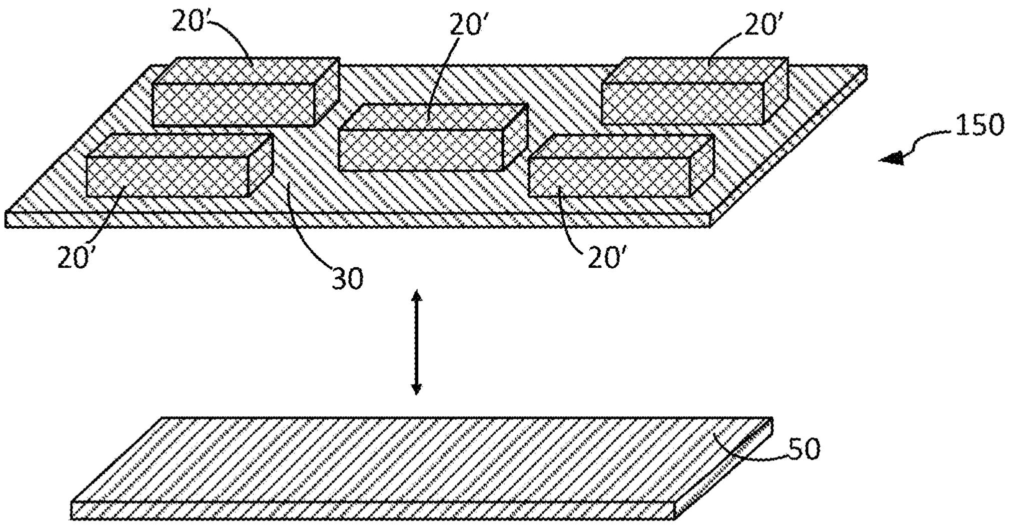
FIG. 23 illustrates a perspective view of an electroadhesive gripper assembly relative to a fragile material according to another embodiment.
Figure 24:
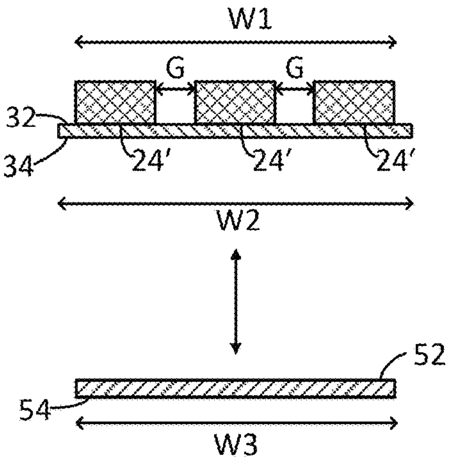
FIG. 24 is a side view of the components shown in FIG. 23.
Figure 25:
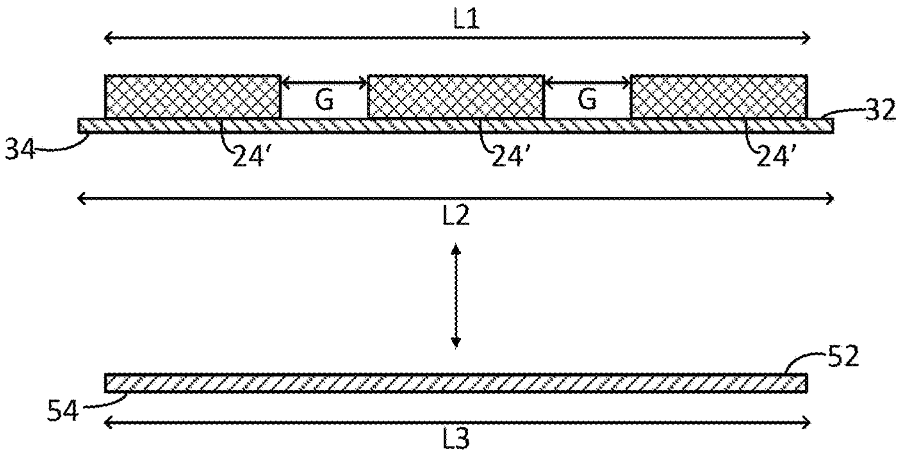
FIG. 25 is a front view of the components shown in FIGS. 23-24.

FIGS. 23-25 illustrate a single contact facing 30 relative to a plurality of electroadhesive grippers 20' and a fragile material 50 according to another embodiment. This embodiment shows five electrostatic grippers 20' each having a rectangular configuration and spaced apart by gaps G. L1 and L3 are equal (i.e., L1=L3). Likewise, W1 and W3 are equal (i.e., W1=W3). L2 is greater than both L1 and L3 (i.e., L2>L1, L3). Also, W2 is greater than both W1 and W3 (i.e., W2>W1, W3). In this embodiment, the contact facing 30 has a length L2 and a width W2 that are greater than the length L1 and width W1. Further, the contact facing 30 has a length L2 and a width W2 that are greater than the length L3 and width W3 of the surface 52 of the fragile material 50. Also, the gripping surface 34 is shown having a surface area that is greater than a surface area of the surface 52.

Figure 26:
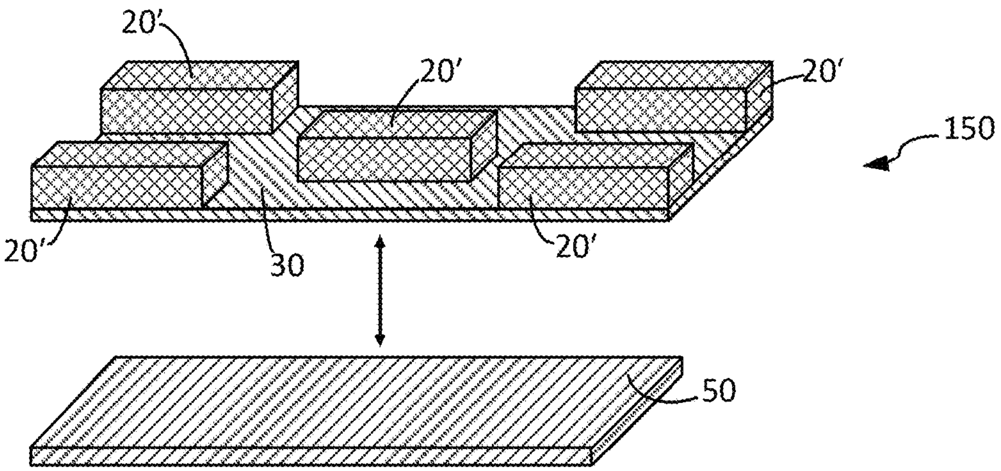
FIG. 26 illustrates a perspective view of an electroadhesive gripper assembly relative to a fragile material according to another embodiment.
Figure 27:
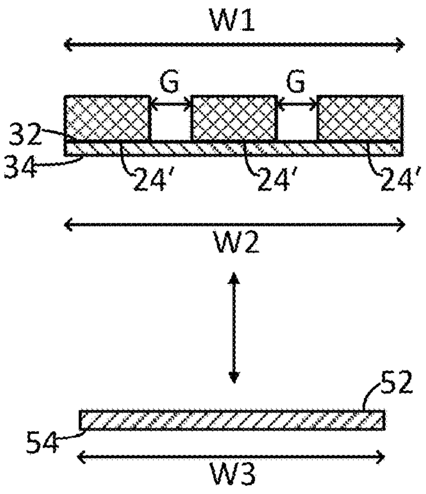
FIG. 27 is a side view of the components shown in FIG. 26.
Figure 28:
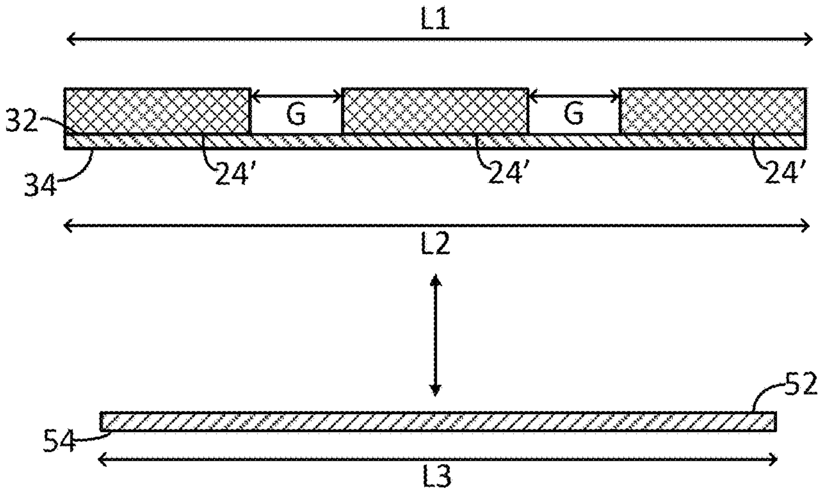
FIG. 28 is a front view of the components shown in FIGS. 26-27.

FIGS. 26-28 illustrate a single contact facing 30 relative to a plurality of electroadhesive grippers 20' and a fragile material 50 according to another embodiment. This embodiment also shows five electrostatic grippers 20' each having a rectangular configuration and spaced apart by gaps G. L1 and L2 are equal (i.e., L1=L2). Likewise, W1 and W2 are equal (i.e., W1=W2). Further, L1 and L2 are each greater than L3 (i.e., L1, L2>L3). Also, W1 and W2 are greater than W3 (i.e., W1, W2>W3). In this embodiment, the contact facing 30 has a length L2 and a width W2 that are equal to the length L1 and width W1. Further, the contact facing 30 has a length L2 and a width W2 that are greater than the length L3 and width W3 of the surface 52. Further, the gripping surface 34 is shown having a surface area that is greater than a surface area of the surface 52.

FIGS. 29-31 illustrate a plurality of contact facings 30' relative to a single electroadhesive gripper 20 and a fragile material 50 according to another embodiment. This embodiments shows eight contact facings 30', but any other number can alternatively be provided. Each contact facing 30' is positioned alongside and in contact with one or more other contact facings 30'. There are no gaps in between contiguous contact facings 30'. The illustrated contact facings 30' each have a rectangular sheet-like configuration. Further, the plurality of contact facings 30' is arranged to form a combined rectangular sheet-like configuration. The length L2 is the combined length of the contact facings 30' in the longitudinal direction Likewise, the width W2 is the combined width of the contact facings 30' in the transverse direction. As shown, L1, L2 and L3 are all equal (i.e., L1=L2=L3). Likewise, W1, W2 and W3 are all equal (i.e., W1=W2=W3). Also, the gripping surfaces 34' is shown having a combined surface area that is equal to a surface area of the surface 52 of the fragile material.

Figure 32:
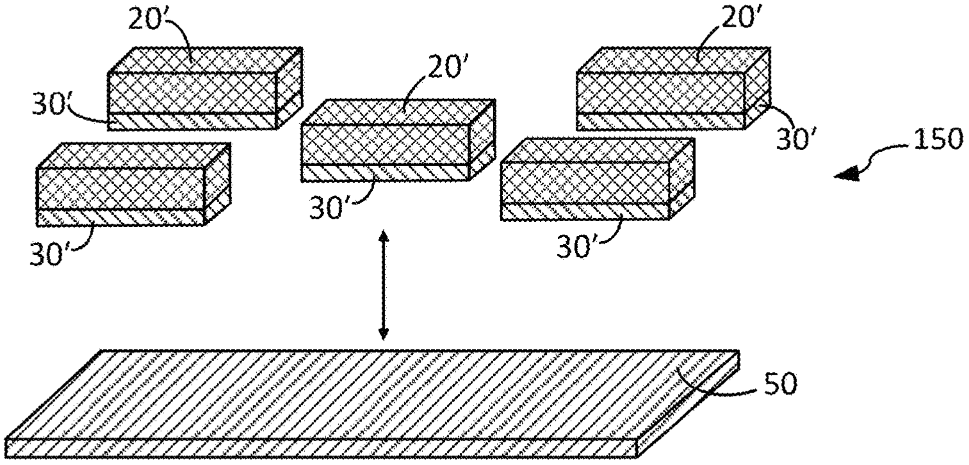
FIG. 32 illustrates a perspective view of an electroadhesive gripper assembly relative to a fragile material according to another embodiment.
Figure 33:
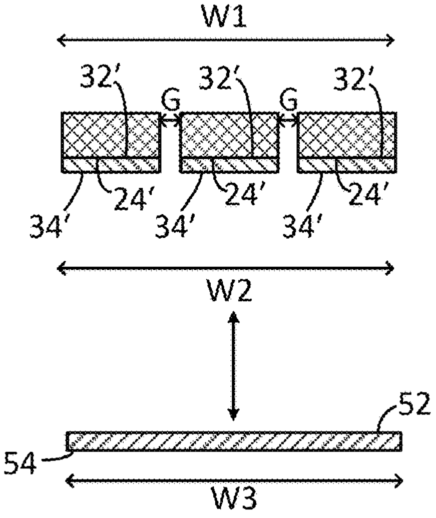
FIG. 33 is a side view of the components shown in FIG. 32.
Figure 34:
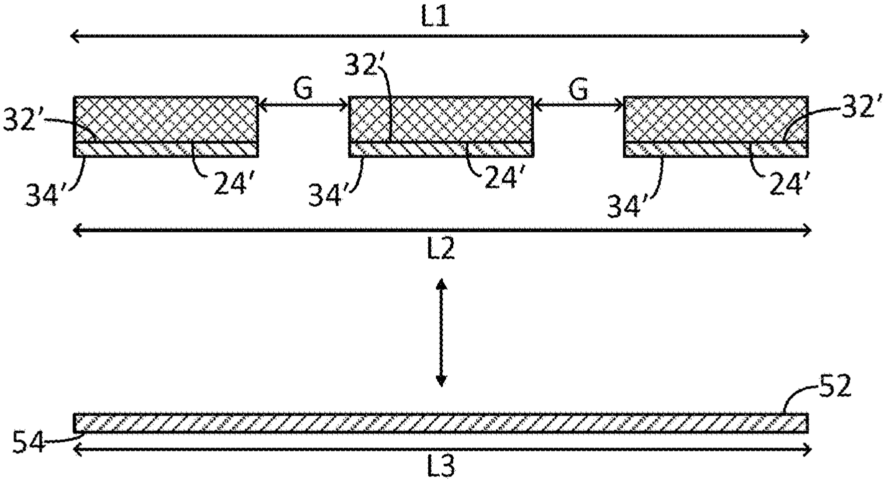
FIG. 34 is a front view of the components shown in FIGS. 32-33.

FIGS. 32-34 illustrate a plurality of contact facings 30' relative to a plurality of electroadhesive grippers 20' and a fragile material 50 according to another embodiment. This embodiments shows five electroadhesive grippers 20' and five contact facings 30', but any other number can alternatively be provided. The illustrated electroadhesive grippers 20' and contact facings 30' each have a rectangular sheet-like configuration. Each electroadhesive gripper 20' is sized and shaped to match an underlying contact facing 30'. For example, each electroadhesive gripper 20' can have a facing surface 24' having dimensions that match those of a connection surface 32' of an underlying contact facing 30'. In the illustrated embodiments, each facing surface 24' has a planar rectangular surface and each connection surface 32' has a matching planar rectangular surface. The plurality of contact facings 30' in combination with the gaps have a length L2 and a width W2. The length L2 is the combined length of the contact facings 30' and the gap lengths in the longitudinal direction Likewise, the width W2 is the combined width of the contact facings 30' and the gap widths in the transverse direction As shown, L1, L2 and L3 are all equal (i.e., L1=L2=L3). Likewise, W1, W2 and W3 are all equal (i.e., W1=W2=W3).

Figure 35:
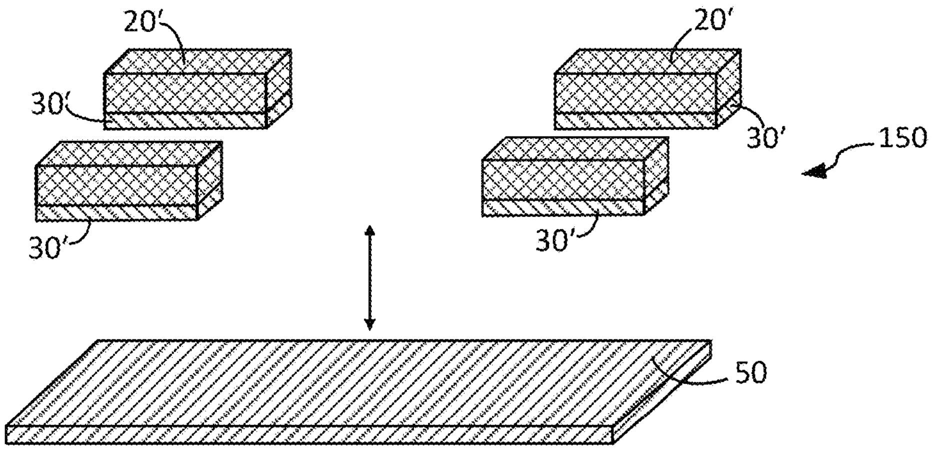
FIG. 35 illustrates a perspective view of an electroadhesive gripper assembly relative to a fragile material according to another embodiment.
Figure 36:
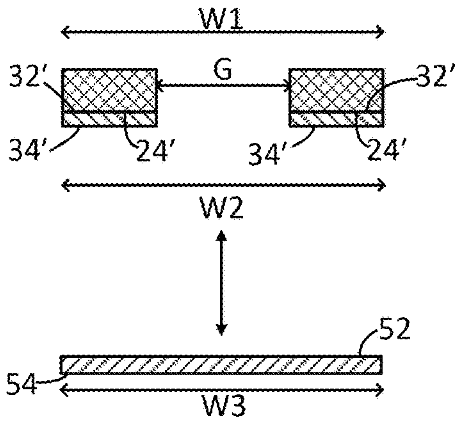
FIG. 36 is a side view of the components shown in FIG. 35.
Figure 37:
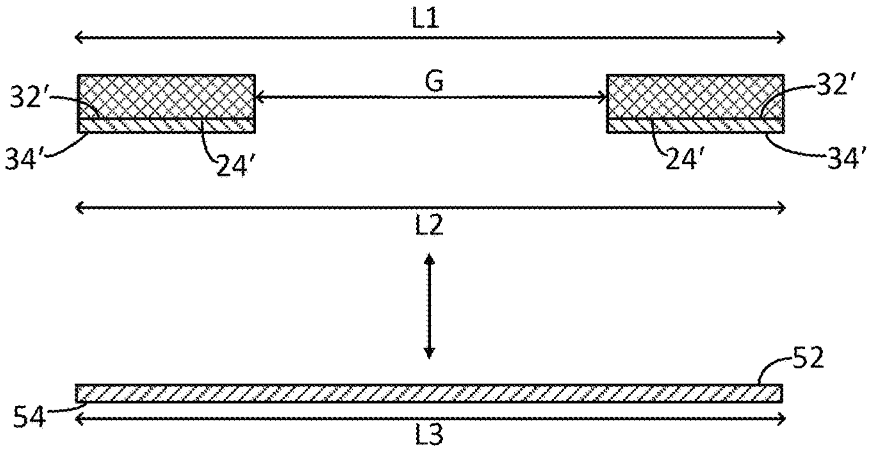
FIG. 37 is a front view of the components shown in FIGS. 35-36.
Figure 38:
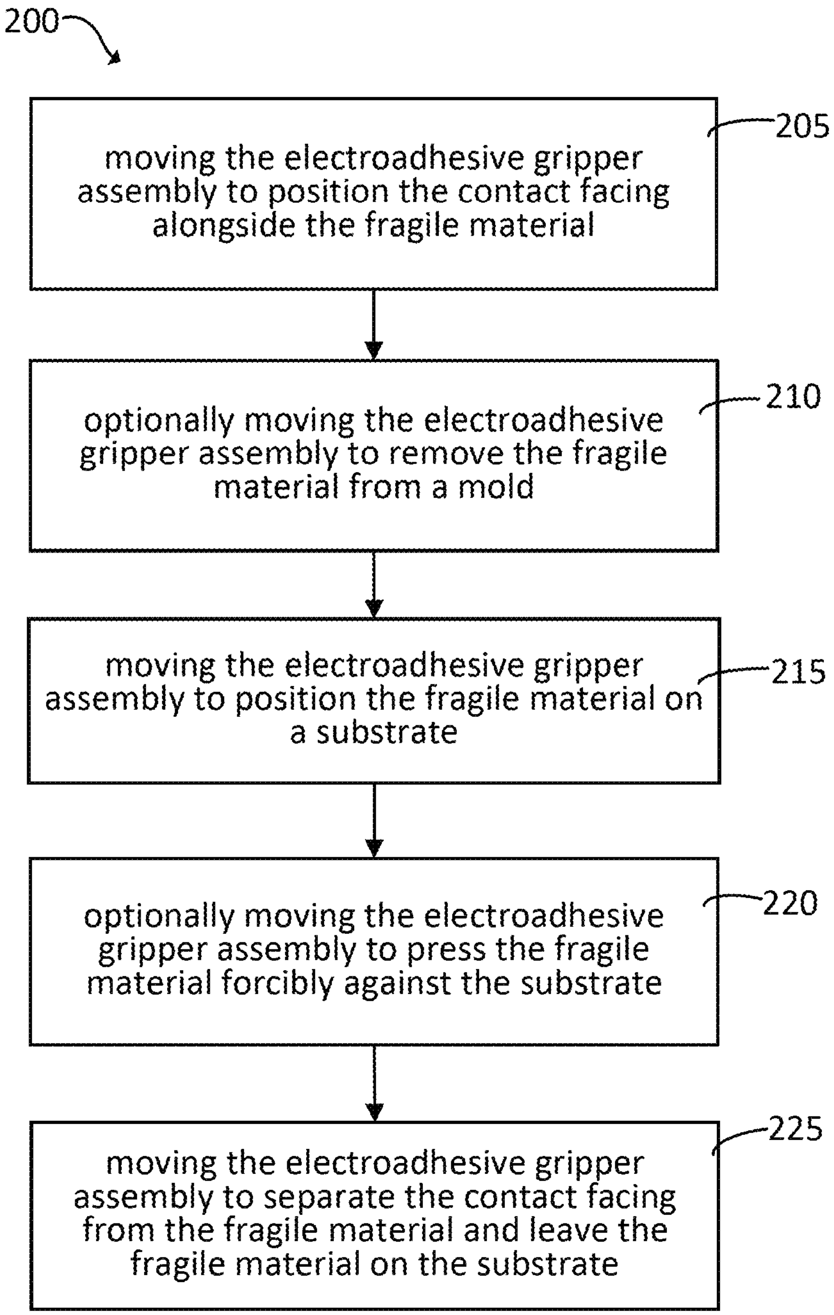
FIG. 38 is a flow chart depicting a method of handling a fragile material according to certain embodiments.
Figure 39:
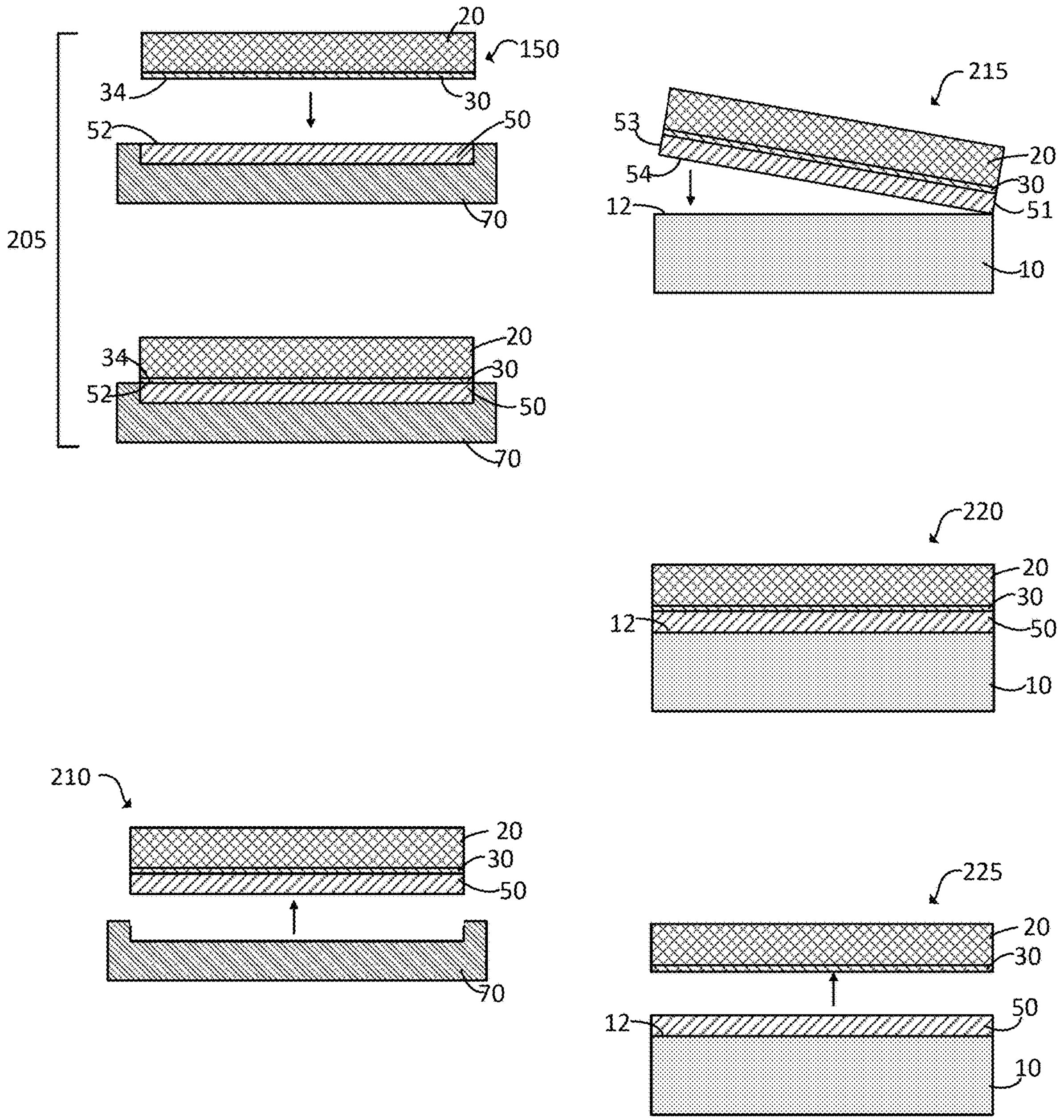
FIG. 39 depicts components of a handling system used to perform methods according to certain embodiments.
Figure 40:
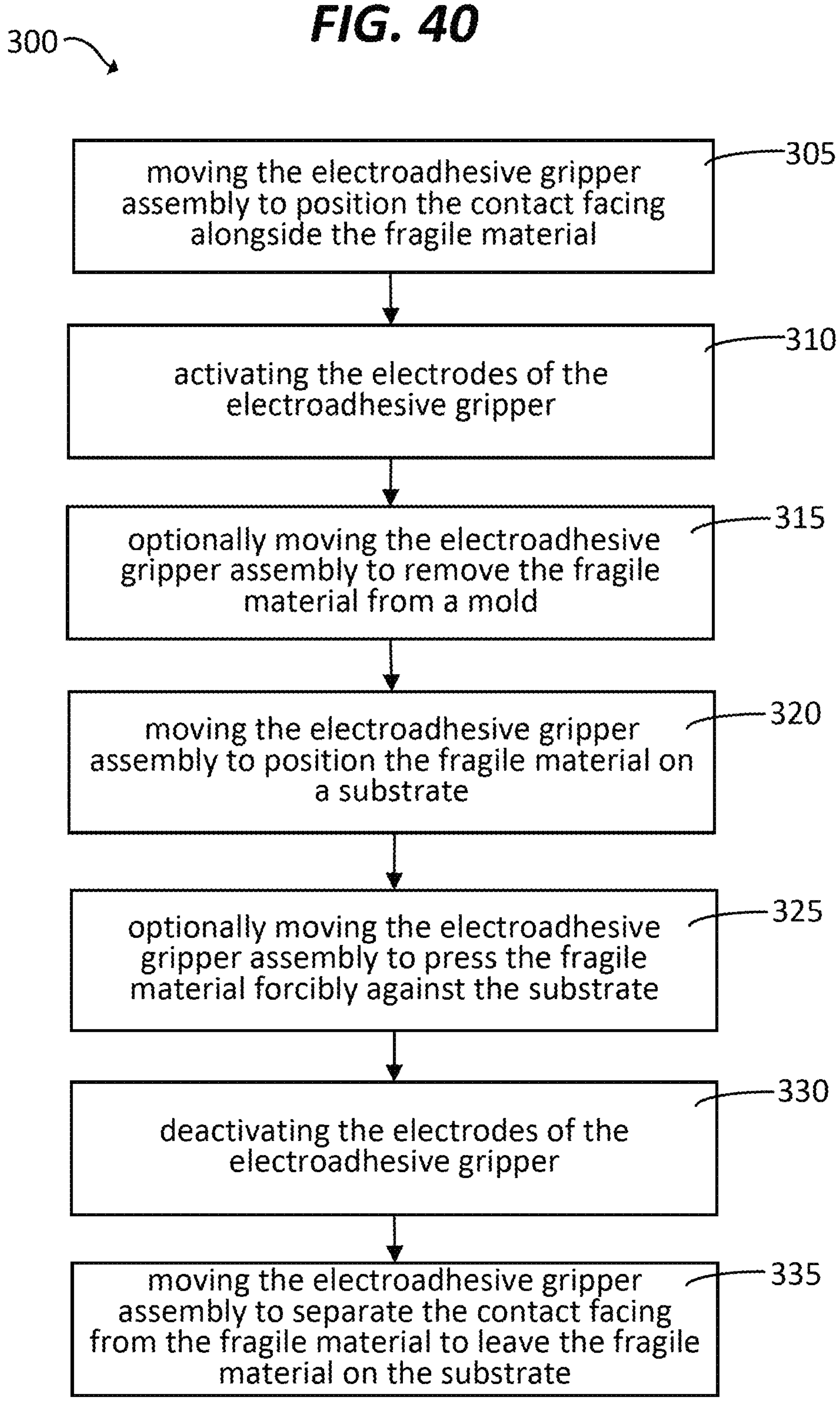
FIG. 40 is a flow chart depicting a method of handling a fragile material according to certain embodiments.
Figure 41:
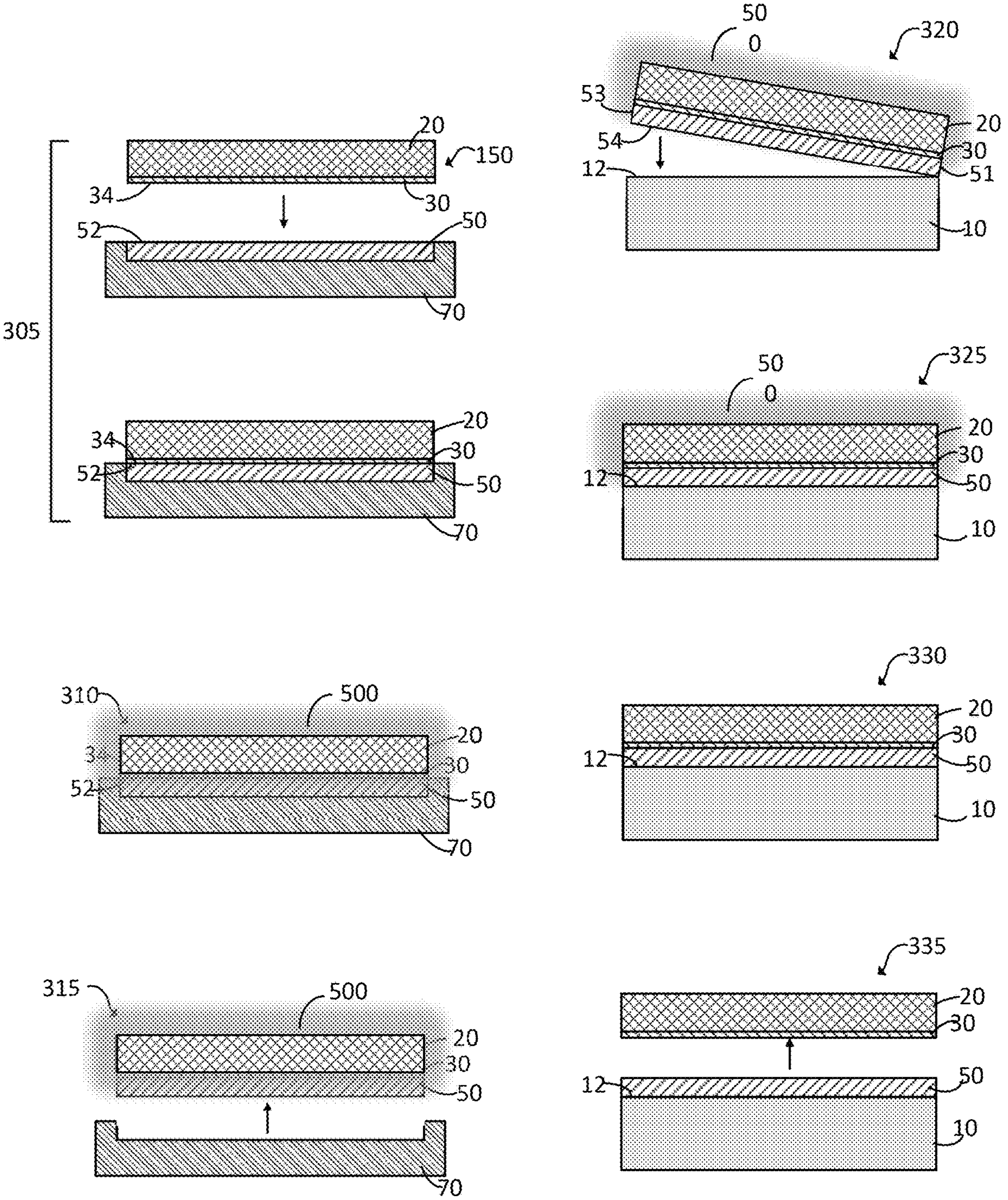
FIG. 41 depicts components of a handling system used to perform methods according to other embodiments.
Figure 42:
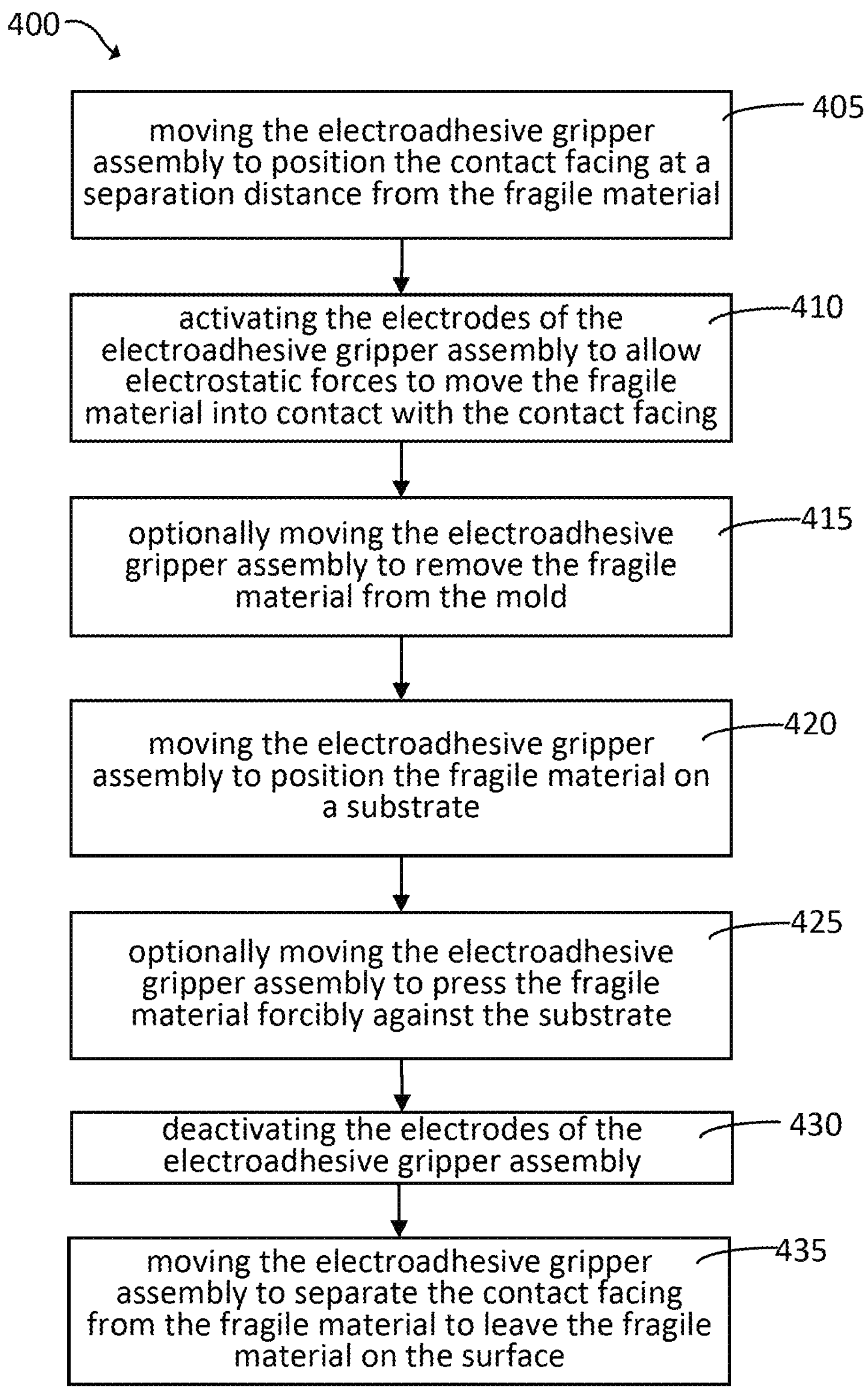
FIG. 42 is a flow chart depicting a method of handling a fragile material according to certain embodiments.
Figure 43:
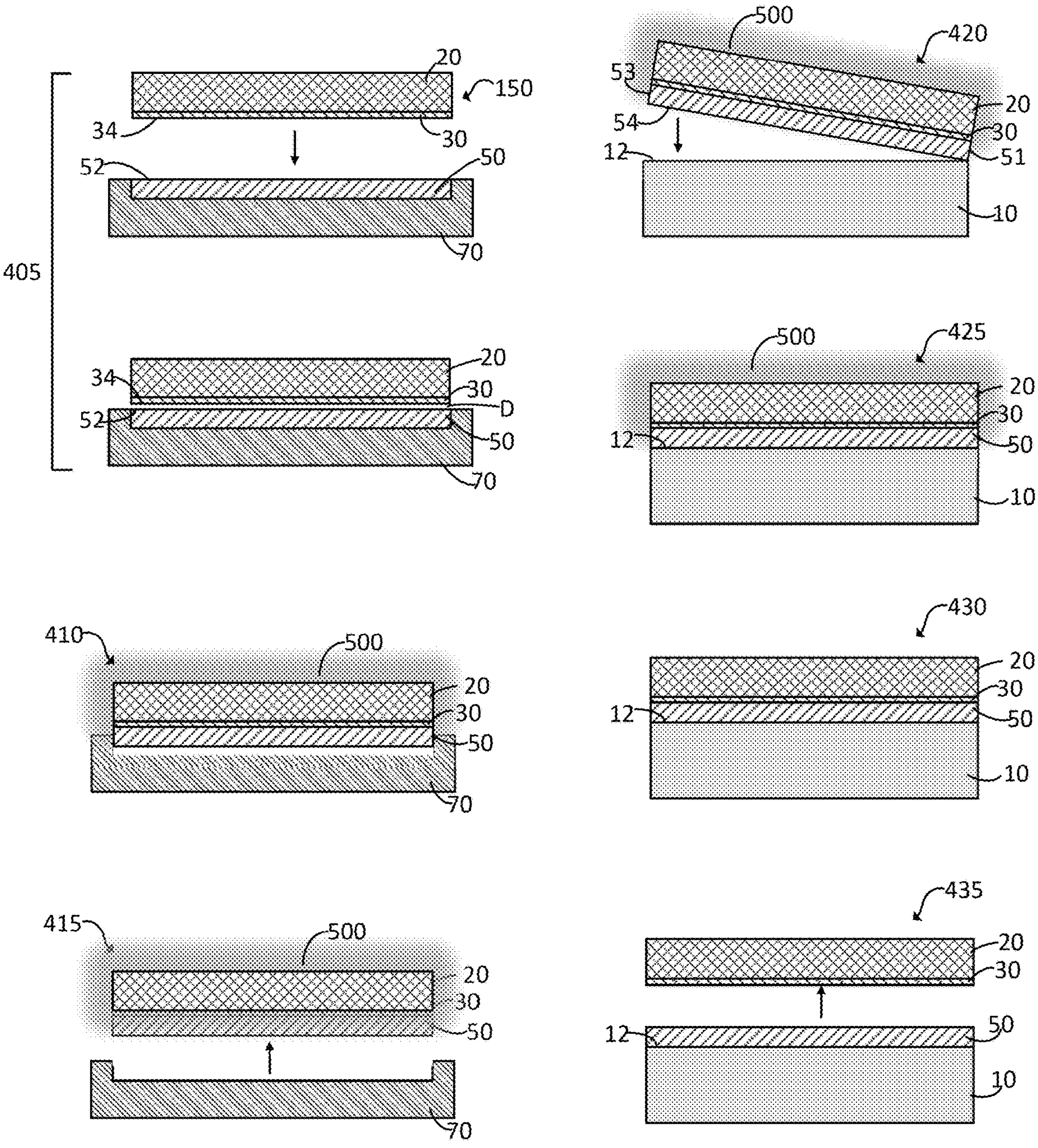
FIG. 43 depicts components of a handling system used to perform methods according to other embodiments.

FIGS. 35-37 illustrate a plurality of contact facings 30' relative to a plurality of electroadhesive grippers 20' and a fragile material 50 according to yet another embodiment. This embodiments shows four electroadhesive grippers 20' and four contact facings 30', but any other number can alternatively be provided. The illustrated electroadhesive grippers 20' and contact facings 30' each have a rectangular sheet-like configuration. Here too, each electroadhesive gripper 20' can have a facing surface 24' having dimensions that match those of a connection surface 32' of an underlying contact facing 30'. L1, L2 and L3 are also all equal (i.e., L1=L2=L3). Likewise, W1, W2 and W3 are all equal (i.e., W1=W2=W3).

Other embodiments provide methods of using a handling apparatus to move a fragile material 50. FIGS. 29, 31 and 33 illustrate flow charts depicting steps of methods according to certain embodiments. FIGS. 30, 32 and 34 illustrate configurations of components used to perform methods such as those illustrated in FIGS. 29, 31 and 33. Skilled artisans will understand that the methods of FIGS. 29, 31 and 33 can be performed using any component or feature described herein and are not limited to the components of FIGS. 30, 32 and 34, which are provided for exemplary and schematic purposes only. In many cases, the fragile material 50 is an aerogel sheet described herein. Further, the substrate 10 can be a glass sheet.

In some embodiments, the apparatuses and methods described here are used to position an aerogel sheet on a glass sheet. A variety of known glass types can be used for the glass sheet, including soda-lime glass or borosilicate glass. In some cases, it may be desirable to use "white glass," a low iron glass, etc. In certain embodiments, the glass sheet will be part of a window, door, skylight, or other glazing. In alternative embodiments, the glass sheet is replaced with a sheet formed of a polymer, such as polycarbonate. Various other polymer materials may be used in such alternative embodiments.

Glass sheets of various sizes can be used. Commonly, large-area glass sheets are used. For example, the glass sheet can have a major dimension (e.g., a length or width) of at least about 0.1 meter, preferably at least about 0.5 meter, more preferably at least about 1 meter, perhaps more preferably at least about 1.5 meters (e.g., between about 2 meters and about 4 meters), and in some cases at least about 3 meters. In some embodiments, the glass sheet 12 is a jumbo glass sheet having a length and/or width that is between about 3 meters and about 10 meters, e.g., a glass sheet having a width of about 3.5 meters and a length of about 6.5 meters.

Glass sheets of various thicknesses can be used. In some embodiments, the glass sheet can have a thickness of about 1-8 mm. In some cases, the glass sheet has a thickness of between about 2.3 mm and about 4.8 mm, and perhaps more preferably between about 2.5 mm and about 4.8 mm. In one particular embodiment, the glass sheet has a thickness of about 3.

The aerogel sheet can be placed in contact with the glass sheet and/or pressed against the glass sheet. In some embodiments, the handling system places the aerogel sheet in contact with the glass sheet, and the aerogel sheet adheres to the glass sheet through van der Waals forces. In other embodiments, the handling system places the aerogel sheet in contact with a glass sheet, and the aerogel sheet is adhered to the glass sheet by an adhesive.

FIG. 29 illustrates a basic method 200 according to certain embodiments. The method comprises steps of using an electroadhesive gripper assembly having an electroadhesive gripper in contact with and/or carrying a contact facing. The method includes a step 205 of moving the electroadhesive gripper assembly to position the contact facing alongside a fragile material, and operating the electroadhesive gripper assembly such that the fragile material is held alongside the contact facing. In embodiments where the fragile material is initially contained within a mold, the method can include an optional step 210 of moving the electroadhesive gripper assembly, together with the fragile material, so as to remove the fragile material from the mold. The method further includes a step 215 of moving the electroadhesive gripper assembly to position the fragile material on a substrate, an optional step 220 of moving the electroadhesive gripper assembly to press the fragile material forcibly against the substrate, and a step 225 of moving the electroadhesive gripper assembly to separate the contact facing from the fragile material and leave the fragile material on the substrate. The optional step 220 can involve pressing the fragile material forcibly against the substrate using a desired pressure, such as a pressure in the range of 0.1 kPa to 100 kPa. The basic method 200 does not specify any steps of activating or deactivating the electroadhesive gripper 20, as skilled artisans will understand that these steps can be performed at any desired step of the method 200. The timing of activating and deactivating the electroadhesive gripper 20 is not limited in method 200.

FIG. 30 illustrates components that can be used to perform the basic method 200 according to certain embodiments. At step 205, an electroadhesive gripper assembly having an electroadhesive gripper 20 and a contact facing 30 is used. The electroadhesive gripper assembly is moved to position the contact facing 30 alongside the fragile material 50. In some cases, the electroadhesive gripper assembly is moved until a gripping surface 34 of the contact facing 30 contacts a surface 52 of the fragile material.

The fragile material 50 is shown contained within a mold 70. However, this is not required. At optional step 210, the electroadhesive gripper assembly is moved, together with the fragile material, so as to remove the fragile material 50 from the mold 70.

At step 215, the electroadhesive gripper assembly is moved, together with the fragile material, so as to position the fragile material 50 on a substrate 10. In some embodiments, the fragile material 50 is an aerogel sheet and the substrate 10 is a glass sheet.

In certain embodiments, only a portion of the surface 54 is initially positioned in contact with a surface 12 of the substrate 10. Specifically, the fragile material 50 has a first side end 51 and a second side end 53. The electroadhesive gripper assembly is moved to initially position only a portion of the surface 54 closest to the first side end 51 in contact with the surface 12. The remainder of the surface 54 is still spaced from the surface 12. The electroadhesive gripper assembly is then moved to position the remaining portions of the surface 54 onto the surface 12 until finally a portion closest to the second side end 53 makes contact. This type of pivoting application may advantageously reduce or eliminate the occurrence of air bubbles getting trapped between the fragile material and the substrate 10.

In other embodiments (not illustrated), the electroadhesive gripper assembly is moved so that the entire surface 54 simultaneously contacts the surface 12. Any desired positioning mechanism (e.g., a robot arm or a gantry system) can be used to move the electroadhesive gripper assembly in the manner desired.

Next, at an optional step 220, the electroadhesive gripper assembly is moved to press the fragile material surface 54 forcibly against the surface 12. Since the fragile material 50 may be stronger in compression than in tension, it can be pressed forcibly onto the surface 12 without severely compromising its integrity. Such a pressing movement can be optionally performed to help adhere the fragile material 50 to the substrate 10.

In some cases, the substrate 10 is an uncoated glass sheet, and the fragile material 50 is an aerogel sheet. In other cases, a coating maybe on surface 12 of the substrate 10. Once positioned on the glass sheet, the aerogel sheet may adhere to the glass sheet through van der Waals forces. Additionally or alternatively, the aerogel sheet may adhere to the glass sheet through adhesive on a surface 12.

At step 225, the electroadhesive gripper assembly is moved to separate the contact facing 30 from the fragile material 50. This leaves the fragile material 50 in place on the substrate 10. At (or just prior to) step 225, electrodes of the electroadhesive grippers (s) may be deactivated.

FIG. 31 illustrates a method 300 according to certain embodiments. The method 300 comprises a step 305 of moving the electroadhesive gripper assembly to position the contact facing alongside the fragile material, and a step 310 of activating the electrodes of an electroadhesive gripper in the assembly to introduce electrostatic forces. This causes the fragile material 50 to be held alongside the contact facing. The method 300 can also comprise an optional step 315 of moving the electroadhesive gripper assembly, together with the fragile material, so as to remove the fragile material from a mold. Further, the method comprises step 320 of moving the electroadhesive gripper assembly, together with the fragile material, so as to position the fragile material on a substrate, an optional step 325 of moving the electroadhesive gripper assembly together with the fragile material, so as to press the fragile material forcibly against the substrate, a step 330 of deactivating the electrodes, and a step 335 of moving the electroadhesive gripper assembly to separate the contact facing from the fragile material and leave the fragile material on the substrate.

FIG. 32 illustrates components that can be used to perform the method 300 according to certain embodiments. Step 305 can involve the components and embodiments described for step 205 of method 200. At step 310, electrodes of the electroadhesive gripper 20 are activated so that electrostatic forces 500 are present. These electrostatic forces 500 allow the gripping surface 34 to hold the surface 52. At step 315, the electroadhesive gripper assembly is moved with the fragile material 50 held by the contact facing 30. For example, the electroadhesive gripper assembly can optionally be moved such that the fragile material 50 is moved out of a mold 70.

At step 320, the electroadhesive gripper assembly is moved, together with the fragile material, so as to position the fragile material 50 on a substrate 10. The electroadhesive gripper assembly can position the fragile material using any components and embodiments described for method 200. Generally, any desired positioning movement can be used to ensure that an entire surface 54 of the fragile material 50 is placed in contact with a surface 12 of the substrate 10. Next, at an optional step 325, the electroadhesive gripper assembly is moved to press the fragile material forcibly against the substrate. Steps 320 and 325 may involve a single, continuous motion that moves the fragile material toward the substrate 10, contacts the fragile material with the substrate, and presses the fragile material forcibly against the substrate. At step 330, the electrodes are deactivated. At step 335, the electroadhesive gripper assembly is moved to separate the contact facing 30 from the fragile material 50. This leaves the fragile material 50 in place on the substrate 10.

FIG. 33 illustrates a method 400 according to certain embodiments. The method 400 comprises a step 405 of moving the electroadhesive gripper assembly to provide the contact facing at a separation distance from the fragile material, and a step 410 of activating the electrodes to allow electrostatic forces to move the fragile material in contact with the contact facing. Here, the electrostatic forces are generated to a magnitude that cases the fragile material to move toward and into contact with the contact facing. In some embodiments, this is done so as to remove the fragile material from a mold. The method 400 further includes a step 420 of moving the electroadhesive gripper assembly, together with the fragile material, so as to position the fragile material on a substrate, an optional step 425 of moving the electroadhesive gripper assembly to press the fragile material forcibly against the substrate, a step 430 of deactivating the electrodes, and a step 435 of moving the electroadhesive gripper assembly to separate the contact facing from the fragile material and leave the fragile material on the substrate.

FIG. 34 illustrates components that can be used to perform the method 400 according to certain embodiments. At step 405, the electroadhesive gripper assembly positions the contact facing 30 such that the gripping surface 34 is separated from the surface 52 of the fragile material by a separation distance D. In some cases, the separation distance D is a distance between 0.5 mm and 5 mm.

At step 410, electrodes are activated so that electrostatic forces 500 are present. Step 410 may be performed prior to, during, or after step 405. These electrostatic forces 500 move the fragile material 50 toward and into contact with the contact facing 30. This may involve the electroadhesive gripper remaining stationary while the fragile material moves upwardly and into contact with the electroadhesive gripper. In particular, the gripping surface 34 contacts and grips the surface 52. At step 415, the electroadhesive gripper assembly is moved together with the fragile material 50 gripped by the contact facing 30. In some embodiments, the electrostatic gripper 20 is moved such that the fragile material 50 is moved entirely out of the mold 70.

At step 420, the electroadhesive gripper assembly is moved, together with the fragile material, so as to position the fragile material 50 on a substrate 10. The electroadhesive gripper assembly can position the fragile material using any components and embodiments described for method 200 or 300. Here too, any desired positioning movement can be used place the fragile material in contact with the surface 12 of the substrate. Next, at an optional step 425, the electroadhesive gripper assembly is moved to press the fragile material surface 54 forcibly against the surface 12. Steps 420 and 425 may both be performed by a single continuous movement. At step 430, the electrodes are deactivated to reduce or eliminate the electrostatic forces. At step 435, the electroadhesive gripper assembly is moved to separate the contact facing 30 from the fragile material 50, leaving the fragile material 50 in place on the substrate 10.

While some preferred embodiments of the invention have been described, it should be understood that various changes, adaptations and modifications may be made therein without departing from the spirit of the invention and the scope of the appended claims.

The invention claimed is:

1. A method of handling an aerogel sheet using a handling apparatus having an electroadhesive gripper assembly with a contact facing, the aerogel sheet being a single layer of aerogel, the method comprising:

moving the electroadhesive gripper assembly so as to position the contact facing alongside the aerogel sheet, the aerogel sheet having a major dimension of greater than 0.9 meter and less than 3 meters;

activating the electroadhesive gripper assembly so as to introduce electrostatic forces that hold the aerogel sheet alongside the contact facing;

moving the electroadhesive gripper assembly together with the aerogel sheet so as to position the aerogel sheet on a glass sheet; deactivating the electroadhesive gripper assembly to reduce or eliminate the electrostatic forces; and moving the electroadhesive gripper assembly so as to separate the contact facing from the aerogel sheet and leave the aerogel sheet on the glass sheet.

2. The method of claim 1 wherein the contact facing comprises a material having a compression modulus that is equal to or lower than a compression modulus of the aerogel sheet.

3. The method of claim 1 wherein the contact facing comprises a material having a hardness that is equal to or lower than a hardness of the aerogel sheet.

4. The method of claim 1 wherein the contact facing comprises a first aerogel material and the aerogel sheet comprises a second aerogel material.

5. The method of claim 4 wherein the first aerogel material and the second aerogel material have the same composition.

6. The method of claim 4 wherein the first aerogel material and the second aerogel material have different compositions, such that the first aerogel material is softer than the second aerogel material.

7. The method of claim 1 wherein the contact facing is configured as a sheet.

8. The method of claim 1 wherein said moving the electroadhesive gripper assembly so as to position the contact facing alongside the aerogel sheet results in the contact facing contacting an entirety of a top surface of the aerogel sheet.

9. The method of claim 1 wherein said moving the electroadhesive gripper assembly together with the aerogel sheet so as to position the aerogel sheet on the glass sheet includes pressing the aerogel sheet forcibly against the glass sheet.

10. The method of claim 9 wherein said moving the electroadhesive gripper assembly together with the aerogel sheet so as to position the aerogel sheet on the glass sheet includes pressing the aerogel sheet forcibly against the glass sheet with a pressure in the range of 0.1 kPa to 100 kPa.

11. A method of handling an aerogel sheet using a handling apparatus having an electroadhesive gripper assembly with a contact facing, the method comprising:

- positioning the electroadhesive gripper assembly to provide the contact facing at a separation distance from the aerogel sheet such that the contact facing does not contact the aerogel sheet; and
- activating the electroadhesive gripper assembly so as to introduce electrostatic forces that move the aerogel sheet toward the contact facing and hold the aerogel sheet alongside the contact facing.

12. The method of claim 11 further comprising:

- moving the electroadhesive gripper assembly together with the aerogel sheet so as to position the aerogel sheet on a substrate;
- deactivating the electroadhesive gripper assembly to reduce or eliminate the electrostatic forces; and
- moving the electroadhesive gripper assembly so as to separate the contact facing from the aerogel sheet and leave the aerogel sheet on the substrate.

13. The method of claim 11 wherein the separation distance is between 0.5 mm and 5 mm.

14. The method of claim 11 wherein the contact facing comprises a material having a compression modulus that is equal to or lower than a compression modulus of the aerogel sheet.

15. The method of claim 11 wherein the contact facing comprises a material having a hardness that is equal to or lower than a hardness of the aerogel sheet.

16. The method of claim 11 wherein the contact facing comprises a first aerogel material and the aerogel sheet comprises a second aerogel material.

17. The method of claim 16 wherein the first aerogel material and the second aerogel material have the same composition.

18. The method of claim 16 wherein the first aerogel material and the second aerogel material have different compositions, such that the first aerogel material is softer than the second aerogel material.

19. The method of claim 11 wherein the contact facing is configured as an aerogel sheet.

20. The method of claim 11 wherein said activating the electroadhesive gripper assembly so as to introduce electrostatic forces that move the aerogel sheet toward the contact facing results in the contact facing contacting an entirety of a top surface of the aerogel sheet.

21. The method of claim 11 wherein said positioning the electroadhesive gripper assembly to provide the contact facing at the separation distance includes holding the contact facing stationary for some time such that said activating the electrostatic gripper assembly so as to introduce electrostatic forces that move the aerogel sheet toward the contact facing includes the aerogel sheet moving relative to the contact facing so as to traverse the separation distance.

22. The method of claim 1 wherein said moving the electroadhesive gripper assembly together with the aerogel sheet so as to position the aerogel sheet on the glass sheet involves a pivoting application that initially positions only a portion of the aerogel sheet in contact with the glass sheet followed by positioning a remainder of the aerogel sheet in contact with the glass sheet.

23. The method of claim 1 wherein the electroadhesive gripper assembly is provided at a connection interface of a support structure of a handling apparatus, the connection interface comprising a housing, carriage, and/or shuttle that moves the electroadhesive gripper assembly along a vertical axis and along at least one horizontal axis.

24. The method of claim 1 wherein the contact facing is releasably fixed to a facing surface of the electroadhesive gripper assembly.

25. The method of claim 1 wherein the glass sheet has a major dimension of at least about 1 meter.

26. The method of claim 1 wherein the aerogel sheet consists essentially of silica-based aerogel.

27. The method of claim 1 wherein the glass sheet is incorporated as part of a window, door, skylight, or other glazing.

28. The method of claim 11 wherein the electroadhesive gripper assembly is provided at a connection interface of a support structure of a handling apparatus, the connection interface comprising a housing, carriage, and/or shuttle that moves the electroadhesive gripper assembly along a vertical axis and along at least one horizontal axis.

29. The method of claim 11 wherein the contact facing is releasably fixed to a facing surface of the electroadhesive gripper assembly.

30. The method of claim 11 wherein the aerogel sheet has a major dimension of greater than 0.9 meter and less than 3 meters.

31. The method of claim 11 wherein substrate is a glass sheet having a major dimension of at least about 1 meter.

32. The method of claim 11 wherein the aerogel sheet consists essentially of silica-based aerogel.

33. The method of claim 12 wherein said moving the electroadhesive gripper assembly together with the aerogel sheet so as to position the aerogel sheet on the substrate involves a pivoting application that initially positions only a portion of the aerogel sheet in contact with the substrate followed by positioning a remainder of the aerogel sheet in contact with the substrate.

34. The method of claim 12 wherein said moving the electroadhesive gripper assembly together with the aerogel sheet so as to position the aerogel sheet on the substrate includes pressing the aerogel sheet forcibly against the substrate.

35. A method of applying an aerogel sheet onto a glass sheet by handling the aerogel sheet with a handling apparatus having an electroadhesive gripper assembly comprising a plurality of electroadhesive grippers, the method comprising:

moving the electroadhesive gripper assembly so as to position the electroadhesive grippers alongside the aerogel sheet, the aerogel sheet having a major dimension of greater than 0.9 meter and less than 3 meters, the plurality of electroadhesive grippers each having a contact facing such that there is a plurality of contact facings, the plurality of contact facings having gripping surfaces with a combined surface area;

activating the electroadhesive gripper assembly to introduce electrostatic forces that hold the aerogel sheet alongside the plurality of contact facings, the combined surface area of the gripping surfaces contacting less than 25% of a top surface of the aerogel sheet;

moving the electroadhesive gripper assembly together with the aerogel sheet to position the aerogel sheet on the glass sheet, the glass sheet having a major dimension of at least about 1 meter;

deactivating the electroadhesive gripper assembly to reduce or eliminate the electrostatic forces; and moving the electroadhesive gripper assembly to separate the plurality of contact facings from the aerogel sheet and leave the aerogel sheet on the glass sheet.

36. The method of claim 35 wherein each electrostatic gripper of the plurality of electroadhesive grippers is spaced apart from each other electrostatic gripper of the plurality of electroadhesive grippers.

37. The method of claim 36 wherein each contact facing of the plurality of contact facings has a rectangular shape.

38. The method of claim 35 wherein the gripping surfaces are defined by silica-based aerogel.

39. The method of claim 35 wherein the glass sheet is incorporated as part of a window, door, skylight, or other glazing.

* * * * *